United States Patent
Hwang et al.

(10) Patent No.: US 11,503,510 B2
(45) Date of Patent: Nov. 15, 2022

(54) METHOD AND APPARATUS FOR RESOURCE MANAGEMENT FOR CONDITIONAL HANDOVER IN WIRELESS COMMUNICATION SYSTEM

(71) Applicant: Samsung Electronics Co., Ltd., Gyeonggi-do (KR)

(72) Inventors: June Hwang, Gyeonggi-do (KR); Himke Van Der Velde, Middlesex (GB)

(73) Assignee: Samsung Electronics Co., Ltd

( * ) Notice: Subject to any disclaimer, the term of this patent is extended or adjusted under 35 U.S.C. 154(b) by 113 days.

(21) Appl. No.: 16/791,354

(22) Filed: Feb. 14, 2020

(65) Prior Publication Data
US 2020/0267604 A1 Aug. 20, 2020

(30) Foreign Application Priority Data
Feb. 14, 2019 (KR) ........................ 10-2019-0017390

(51) Int. Cl.
*H04W 36/00* (2009.01)
*H04W 76/11* (2018.01)
(Continued)

(52) U.S. Cl.
CPC ....... *H04W 36/0016* (2013.01); *H04W 36/08* (2013.01); *H04W 36/26* (2013.01);
(Continued)

(58) Field of Classification Search
None
See application file for complete search history.

(56) References Cited

U.S. PATENT DOCUMENTS

| 2007/0184838 A1* | 8/2007 | Van Der Velde | H04W 36/30 455/436 |
| 2013/0044708 A1* | 2/2013 | Kim | H04W 76/40 370/329 |

(Continued)

FOREIGN PATENT DOCUMENTS

| EP | 3 589 015 | 1/2020 |
| WO | WO 2018/170825 | 9/2018 |
| WO | WO 2018/171739 | 9/2018 |

OTHER PUBLICATIONS

MediaTek Inc., "Conditional Handover Procedures", R2-1816959, 3GPP TSG-RAN WG2 Meeting #104, Nov. 12-16, 2018, 6 pages.
(Continued)

*Primary Examiner* — Nicholas Sloms
(74) *Attorney, Agent, or Firm* — The Farrell Law Firm, P.C.

(57) ABSTRACT

The present disclosure relates to a communication method and system for converging a 4th-Generation (4G) communication system or a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The disclosure discloses a method by a first base station in a wireless communication system, the method including transmitting, to a second base station, a handover (HO) request message including conditional handover (CHO) information; and receiving, from the second base station, a HO request acknowledge message including identifier information on at least one cells associated with the second base station.

20 Claims, 17 Drawing Sheets

(51) Int. Cl.
  *H04W 76/27*  (2018.01)
  *H04W 36/38*  (2009.01)
  *H04W 36/08*  (2009.01)
  *H04W 36/26*  (2009.01)

(52) U.S. Cl.
  CPC ............ *H04W 36/38* (2013.01); *H04W 76/11* (2018.02); *H04W 76/27* (2018.02)

(56) References Cited

U.S. PATENT DOCUMENTS

| | | | |
|---|---|---|---|
| 2013/0058245 A1* | 3/2013 | Van Lieshout | H04W 24/10 370/252 |
| 2014/0126545 A1 | 5/2014 | Tamura et al. | |
| 2014/0211762 A1* | 7/2014 | Bontu | H04W 36/30 370/332 |
| 2014/0287726 A1* | 9/2014 | Jang | H04W 12/10 455/411 |
| 2015/0109946 A1* | 4/2015 | Sharma | H04W 24/08 370/252 |
| 2015/0271713 A1* | 9/2015 | Kim | H04W 72/04 455/437 |
| 2017/0055187 A1* | 2/2017 | Kang | H04W 36/0069 |
| 2017/0273134 A1* | 9/2017 | Cao | H04W 36/04 |
| 2018/0041936 A1* | 2/2018 | Kim | H04W 72/085 |
| 2018/0192347 A1* | 7/2018 | Shaheen | H04W 36/0077 |
| 2018/0227805 A1 | 8/2018 | Jang et al. | |
| 2019/0028942 A1 | 1/2019 | Tang et al. | |
| 2019/0223073 A1* | 7/2019 | Chen | H04W 36/0079 |
| 2019/0387440 A1* | 12/2019 | Yiu | H04W 36/00837 |
| 2020/0029251 A1* | 1/2020 | Wu | H04W 36/0016 |
| 2021/0029600 A1* | 1/2021 | Balan | H04W 36/00837 |
| 2021/0120458 A1* | 4/2021 | Koskela | H04W 36/0016 |
| 2021/0297907 A1* | 9/2021 | Jokela | H04W 76/30 |
| 2021/0368540 A1* | 11/2021 | Chin | H04W 56/001 |

OTHER PUBLICATIONS

Huawei, HiSilicon, "Discussion on Conditional HO", R2-1802665, 3GPP TSG-RAN WG2 Meeting #101, Feb. 26-Mar. 2, 2018, 4 pages.

Nokia et al., "Baseline CR for TS 38.413", R3-187279, 3GPP TSG-RAN WG3 Meeting #102, Nov. 12-16, 2018, 296 pages.

Nokia et al., "Basic Details of Conditional Handover in E-UTRAN", R2-1900613, 3GPP TSG-RAN WG2 Meeting #105, Feb. 25-Mar. 1, 2019, 4 pages.

International Search Report dated May 20, 2020 issued in counterpart application No. PCT/KR2020/002121, 7 pages.

Nokia et al., "Baseline of Conditional Handover and its Optional Enhancements", R2-1817686, 3GPP TSG-RAN WG2 Meeting #104, Nov. 12-16, 2018, 4 pages.

Ericsson, "[TP for BL CR 38.423] Rapporteur's Work: Various Non-Editorial Corrections", R3-187090, 3GPP TSG-RAN WG3 Meeting #102, Nov. 12-16, 2018, 257 pages.

European Search Report dated Jun. 21, 2022 issued in counterpart application No. 20755609.3-1216, 36 pages.

* cited by examiner

METHOD AND APPARATUS FOR RESOURCE MANAGEMENT FOR CONDITIONAL HANDOVER IN WIRELESS COMMUNICATION SYSTEM

CROSS-REFERENCE TO RELATED APPLICATION(S)

This application claims priority under 35 U.S.C. § 119(a) to Korean Patent Application No. 10-2019-0017390, filed on Feb. 14, 2019, in the Korean Intellectual Property Office, the disclosure of which is incorporated herein by reference in its entirety.

BACKGROUND

1. Field

The present disclosure relates to generally to conditional handover in a wireless communication system, and more particularly, to resource management for conditional handover in a wireless communication system.

2. Description of Related Art

To meet the demand for increased wireless data traffic since the deployment of 4G communication systems, efforts have been made to develop an improved 5G or pre-5G communication system. The 5G or pre-5G communication system is referred to as a "beyond 4G network" or a "post LTE system". The 5G communication system is to be implemented in higher frequency (mmWave) bands, e.g., 60 GHz bands, so as to achieve higher data rates. To decrease propagation loss of the radio waves and increase the transmission distance, the beamforming, massive multiple-input multiple-output (MIMO), full dimensional MIMO (FD-MIMO), array antenna, analog beam forming, and large scale antenna techniques are described in 5G communication systems. In addition, in 5G communication systems, development for system network improvement is based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and frequency quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet is now evolving into the Internet of things (IoT) where distributed entities exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, machine-to-machine (M2M) communication, and machine type communication (MTC), for example, have been researched. Such an IoT environment may provide intelligent Internet technology services that collect and analyze data generated among connected things. IoT may be applied to a variety of fields including smart home, smart building, smart city, smart or connected cars, smart grid, health care, smart appliances, and advanced medical services through convergence and combination of existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of mobile communication systems, and thus, a method for effectively providing these services has been required.

SUMMARY

The disclosure provides a method for allocating resources when a terminal performs a conditional handover.

The disclosed embodiments provide an apparatus and a method for effectively providing services in a mobile communication system.

In accordance with an aspect of the disclosure, a method by a first base station in a wireless communication system is provided. The method includes transmitting, to a second base station, a handover(HO) request message including conditional handover (CHO) information; and receiving, from the second base station, a HO request acknowledge message including identifier information on at least one cells associated with the second base station.

According to another aspect of the disclosure, a method by a second base station in a wireless communication system is provided. The method includes receiving, from a first base station, a handover (HO) request message including conditional handover (CHO) information; and transmitting, to the first base station, a HO request acknowledge message including identifier information on at least one cells associated with the second base station. According to another aspect of the disclosure, a first base station in a wireless communication system is provided. The first base station includes a transceiver; and a controller coupled with the transceiver and configured to: transmit, to a second base station, a handover (HO) request message including conditional handover (CHO) information; and receive, from the second base station, a HO request acknowledge message including identifier information on at least one cells associated with the second base station.

According to another aspect of the disclosure, a second base station in a wireless communication system is provided. The second base station includes a transceiver; and a controller coupled with the transceiver and configured to: receive, from a first base station, a handover (HO) request message including conditional handover (CHO) information; and transmit, to the first base station, a HO request acknowledge message including identifier information on at least one cells associated with the second base station.

BRIEF DESCRIPTION OF THE DRAWINGS

The above and other aspects, features, and advantages of the present disclosure will be more apparent from the following detailed description when taken in conjunction with the accompanying drawings, in which.

DETAILED DESCRIPTION

Figure 1:
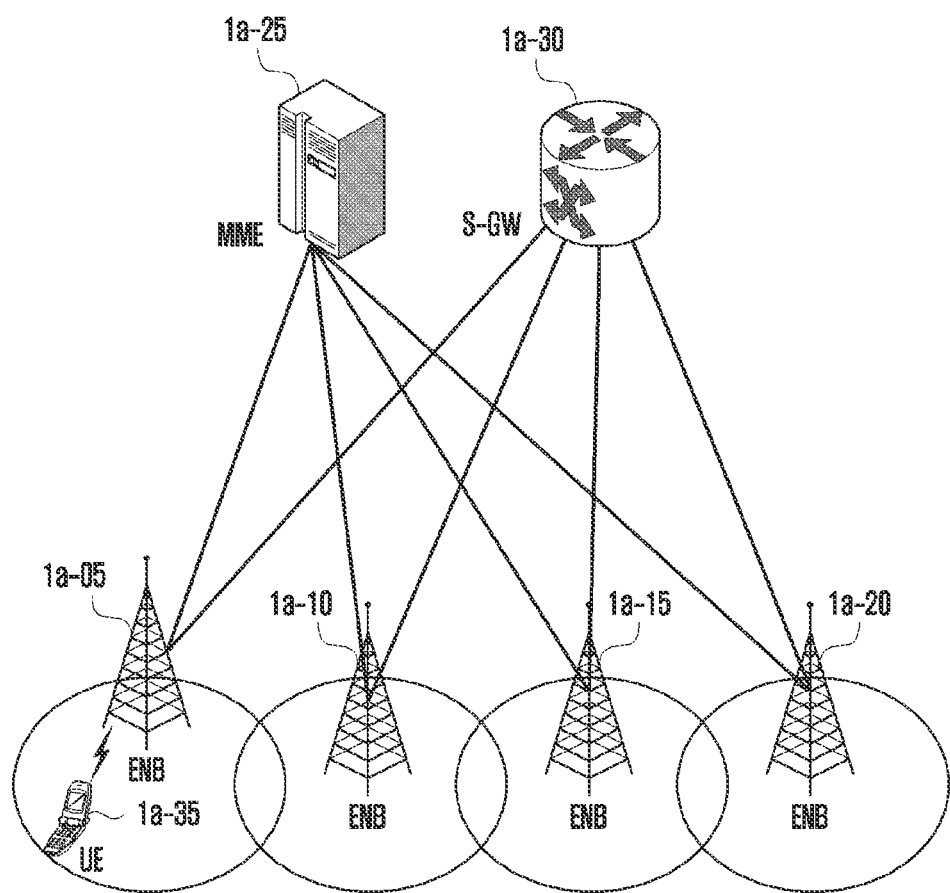
FIG. 1 is a diagram illustrating a structure of an LTE system, according to an embodiment.

Embodiments of the disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure.

The terms, as described below, are defined in consideration of the functions in the embodiments, and the meanings of the terms may vary according to the intention of a user or operator, convention, or the like. Therefore, the definitions of the terms should be made based on the contents throughout the specification.

In the following description, terms for identifying an access node, terms referring to network entities, terms referring to messages, terms referring to interfaces between network entities, and terms referring to various pieces of identification information are used for convenience of description. Accordingly, the disclosure is not limited to the following terms and other terms having the same technical meaning may be used.

For convenience of description, the disclosure uses terms and names defined in a 3rd Generation Partnership Project Long Term Evolution (3GPP LTE). However, the disclosure is not limited by the terms and names, and may be equally applied to a system that is based on another standard.

Here, it will be understood that each block of flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used in embodiments of the disclosure, the term "unit" may mean a software component or a hardware component such as a field programmable gate array (FPGA) or application specific integrated circuit (ASCI), and the "unit" performs certain functions. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, "unit" or divided into a larger number of elements, "unit". Moreover, the elements and "units" may be implemented to reproduce one or more CPUs within a device or a security multimedia card. In addition, in an embodiment, "~unit" may include one or more processors.

In the following description of the disclosure, a detailed description of known configurations or functions incorporated herein will be omitted when it is determined that the detailed description may make the subject matter of the disclosure unclear. Hereinafter, embodiments of the disclosure will be described with reference to the accompanying drawings.

In the following description, a terminal may refer to a MAC entity in the terminal that exists in each of a master cell group (MCG) and a secondary cell group (SCG) as described below.

Hereinafter, a base station is a subject performing resource allocation of a terminal and may be at least one of a gNode B, an eNode B, a Node B, a base station (BS), a wireless access unit, a base station controller, or a node on a network. The terminal may include a user equipment (UE), a mobile station (MS), a cellular phone, a smart phone, a computer, or a multimedia system capable of performing a communication function. Of course, it is not limited to the above examples.

In particular, the disclosure is applicable to 3GPP new radio (NR) ($5^{th}$ generation mobile communication standard). The disclosure can also be applied to intelligent services (e.g., smart home, smart building, smart city, smart car or connected car, healthcare, digital education, retail, security and safety related services, etc.), based on 5G communication technology and IoT related technology. In the disclosure, the eNB may be used interchangeably with the gNB for convenience of description. That is, the base station described as an eNB may indicate a gNB. The term "terminal" may also refer to other wireless communication devices as well as mobile phones, NB-IoT devices and sensors.

The wireless communication system has evolved from providing initial voice-oriented services to broadband wireless communication systems that provide high-speed, high-quality packet data services, for example, communication standards such as high speed packet access (HSPA) in 3GPP, long term evolution (LTE) or evolved universal terrestrial radio access (E-UTRA), LTE-advanced (LTE-A), LTE-pro, high rate packet data (HRPD) of 3GPP2, ultra mobile broadband (UMB), and IEEE 802.16e, etc.

As a representative example of the broadband wireless communication system, an LTE system adopts an orthogonal frequency division multiplexing (OFDM) scheme in a downlink (DL) and a single carrier frequency division multiple access (SC-FDMA) scheme in an uplink (UL). The uplink refers to a radio link through which a terminal (UE or MS) transmits data or a control signal to a base station (eNode B or BS), and the downlink refers to a radio link through which a base station transmits data or a control signal to a terminal. In the multiple access scheme as described above, the data or control information of each user is distinguished by allocating and operating the time-frequency resources for carrying data or control information for each user so as not to overlap each other, that is, orthogonality is established.

A future communication system after LTE, that is, a 5G communication system should be able to freely reflect various requirements of users and service providers, so that services satisfying all the various requirements should be supported. Services considered for the 5G communication system include enhanced mobile broadband (eMBB) communications, massive machine type communication (mMTC), and ultra-reliable low latency communication (URLLC), etc.

According to some embodiments, the eMBB may aim to provide a data rate higher than that of the existing LTE, LTE-A, or LTE-pro. For example, in a 5G communication system, the eMBB should be able to provide a peak data rate of 20 Gbps in a downlink and a peak data rate of 10 Gbps in an uplink, from one base station perspective. In addition, the 5G communication system may be required to provide the increased user perceived data rate, in addition to providing the peak data rate. In order to meet such requirements, the 5G communication systems may require the improvement of various transmission/reception technologies, including an improved MIMO transmission technology. In addition, while the current LTE transmits signals using the maximum 20 MHz transmission bandwidth in the 2 GHz band, the 5G communication system uses a wider bandwidth than 20 MHz in the frequency band of 3~6 GHz or 6 GHz or more, thereby satisfying the data transmission rate required in the 5G communication system.

In addition, the mMTC is being considered to support application services such as the IoT in the 5G communication systems. In order to efficiently provide the IoT, the mMTC may require a large terminal access support within a cell, improved terminal coverage, improved battery time, and reduced terminal cost. Since the IoT is attached to various sensors and various devices to provide a communication function, it should be able to support a large number of terminals (e.g., 1,000,000 terminals/$km^2$) in a cell. In addition, since the terminal supporting the mMTC is likely to be located in a shadow area that the cell does not cover, such as the basement of the building, more coverage may be required than other services provided by the 5G communication system. The terminal supporting the mMTC should be configured as a low-cost terminal, and because it is difficult to replace the battery of the terminal frequently, very long battery life time such as 10~15 years may be required.

Finally, URLLC, which is a cellular-based wireless communication service used for mission-critical purposes, may be used for services used for remote control for robots or machinery, industrial automation, unmanned aerial vehicles, remote health care, emergency alerts, and the like. Accordingly, the communication provided by URLLC may have to provide very low latency (ultra-low latency) and very high reliability (super reliability). For example, services supporting URLLC must satisfy the air interface latency of less than 0.5 milliseconds and may also have a requirement of a packet error rate of $10^{-5}$ or less. Therefore, for services supporting URLLC, the 5G communication system should provide a smaller transmit time interval (TTI) than other services, and a design that can allocate a wider resource in a frequency band in order to secure the reliability of the communication link may be required.

The above-described three services considered in the 5G communication system, that is, eMBB, URLLC, and mMTC, may be multiplexed and transmitted in one system. In this case, different transmission/reception schemes and transmission/reception parameters may be used for the services to satisfy different requirements of respective services. However, the above-described mMTC, URLLC, and eMBB are merely examples of different service types, and the service types to which the disclosure is applied are not limited to the above-described examples.

In addition, the following describes embodiments of the disclosure using LTE, LTE-A, LTE-pro, or 5G (or NR, next generation mobile communication) system as an example, but the embodiments of the disclosure can also be applied to other communication systems having similar technical backgrounds or channel types. In addition, the embodiments of the disclosure can be applied to other communication systems via some modifications within the scope of the disclosure by the judgment of those skilled in the art.

FIG. 1 is a diagram illustrating a structure of an LTE system, according to an embodiment.

Referring to FIG. 1, as illustrated, a radio access network of the LTE system is composed of evolved Node Bs (hereinafter, referred to as ENB, Node B, or base station) 1a-05, 1a-10, 1a-15 and 1a-20, a mobility management entity (MME) 1A-25 and a serving-gateway (S-GW) 1a-30. A user equipment (hereinafter, referred to as UE or terminal) 1a-35 is connected to an external network through the ENBs 1a-05 to 1a-20 and the S-GW 1a-30.

In FIG. 1, the ENBs 1a-05 to 1a-20 may correspond to the existing node B (Node B) of a universal mobile telecommunications system (UMTS). The ENBs may be connected to the UE 1a-35 through a radio channel and may play a more complicated role than the existing Node B. In the LTE system, all user traffic, including real-time services such as voice over IP (VoIP) can be serviced via a shared channel. Accordingly, a device for scheduling by collecting state information such as buffer states, available transmit power states, and channel states of UEs may be needed and the ENBs 1a-05 to 1a-20 may be in charge of that. One ENB can typically control multiple cells. For example, in order to realize a transmission rate of 100 Mbps, the LTE system may use, for example, OFDM as a radio access technology in a 20 MHz bandwidth. In addition, the ENB may apply an adaptive modulation & coding (AMC) scheme that determines a modulation scheme and a channel coding rate according to the channel state of the UE. The S-GW 1a-30 is a device for providing a data bearer and may generate or remove a data bearer under the control of the MME 1a-25. The MME is a device that is in charge of various control functions as well as a mobility management function for the UE and may be connected to a plurality of base stations.

Figure 2:
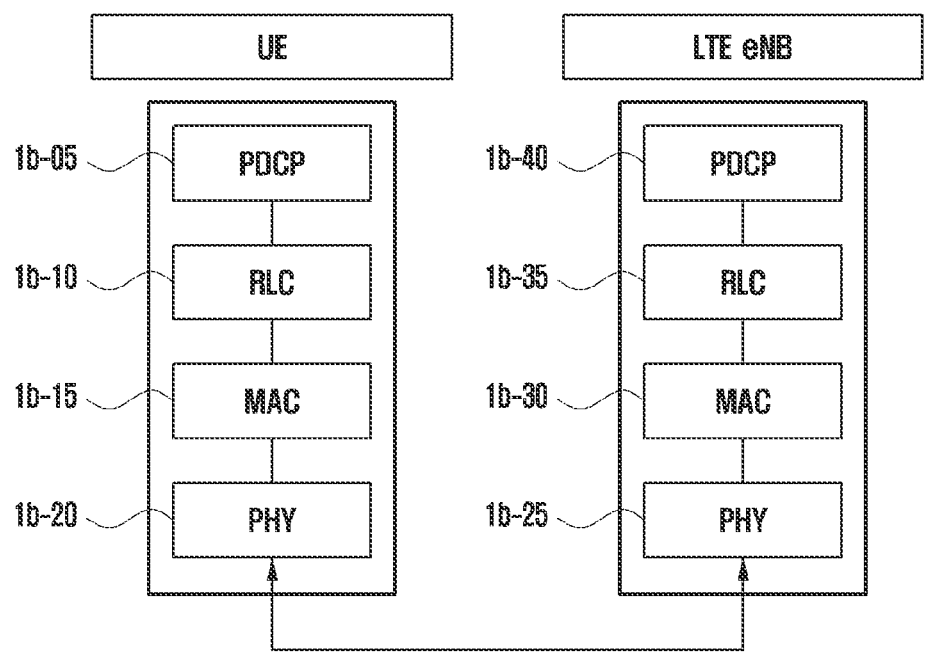
FIG. 2 is a diagram illustrating a wireless protocol structure of an LTE system, according to an embodiment.

FIG. 2 is a diagram illustrating a wireless protocol structure of an LTE system, according to an embodiment.

Referring to FIG. 2, the wireless protocol of the LTE system includes a packet data convergence protocol (PDCP) 1b-05 and 1b-40, a radio link control (RLC) 1b-10 and 1b-35, and a medium access control (MAC) 1b-15 and 1b-30, in a UE and an ENB, respectively. The PDCP may be responsible for operations such as IP header compression/restore. The main functions of the PDCP can be summarized as follows, but are not limited to the following examples.
  Header compression and decompression: ROHC only
  Transfer of user data
  In-sequence delivery of upper layer PDUs at PDCP re-establishment procedure for RLC AM
  For split bearers in DC (only support for RLC AM): PDCP PDU routing for transmission and PDCP PDU reordering for reception
  Duplicate detection of lower layer SDUs at PDCP re-establishment procedure for RLC AM
  Retransmission of PDCP SDUs at handover and, for split bearers in DC, of PDCP PDUs at PDCP data-recovery procedure, for RLC AM
  Ciphering and deciphering
  Timer-based SDU discard in uplink According to an embodiment, the RLC 1b-10 and 1b-35 may reconfigure the PDCP packet data unit (PDU) to an appropriate size to perform an automatic repeat request (ARQ) operation or the like. The main functions of RLC can be summarized as follows, but are not limited to the following examples.
  Transfer of upper layer PDUs
  Error Correction through ARQ (only for AM data transfer)
  Concatenation, segmentation and reassembly of RLC SDUs (only for UM and AM data transfer)
  Re-segmentation of RLC data PDUs (only for AM data transfer)
  Reordering of RLC data PDUs (only for UM and AM data transfer)
  Duplicate detection (only for UM and AM data transfer)
  Protocol error detection (only for AM data transfer)
  RLC SDU discard (only for UM and AM data transfer)
  RLC re-establishment According to an embodiment, the MAC 1b-15 and 1b-30 may be connected to various RLC layer devices configured in one terminal and may perform operations of multiplexing the RLC PDUs to the MAC PDU and demultiplexing the RLC PDUs from the MAC PDU. The main functions of the MAC may be summarized as follows, but are not limited to the following examples.
  Mapping between logical channels and transport channels
  Multiplexing/demultiplexing of MAC SDUs belonging to one or different logical channels into/from transport blocks (TB) delivered to/from the physical layer on transport channels
  Scheduling information reporting
  Error correction through hybrid ARQ (HARQ)
  Priority handling between logical channels of one UE
  Priority handling between UEs by means of dynamic scheduling
  MBMS service identification
  Transmission format selection
  Padding According to an embodiment, the physical layers 1b-20 and 1b-25 may perform operations of channel coding and modulating upper layer data, making an OFDM symbol and transmitting the same via a radio channel, or operations of demodulating and channel decoding the OFDM symbol received via the radio channel, and transmitting to the upper layer. However, the operations are not limited to the above-described examples.

Figure 3:
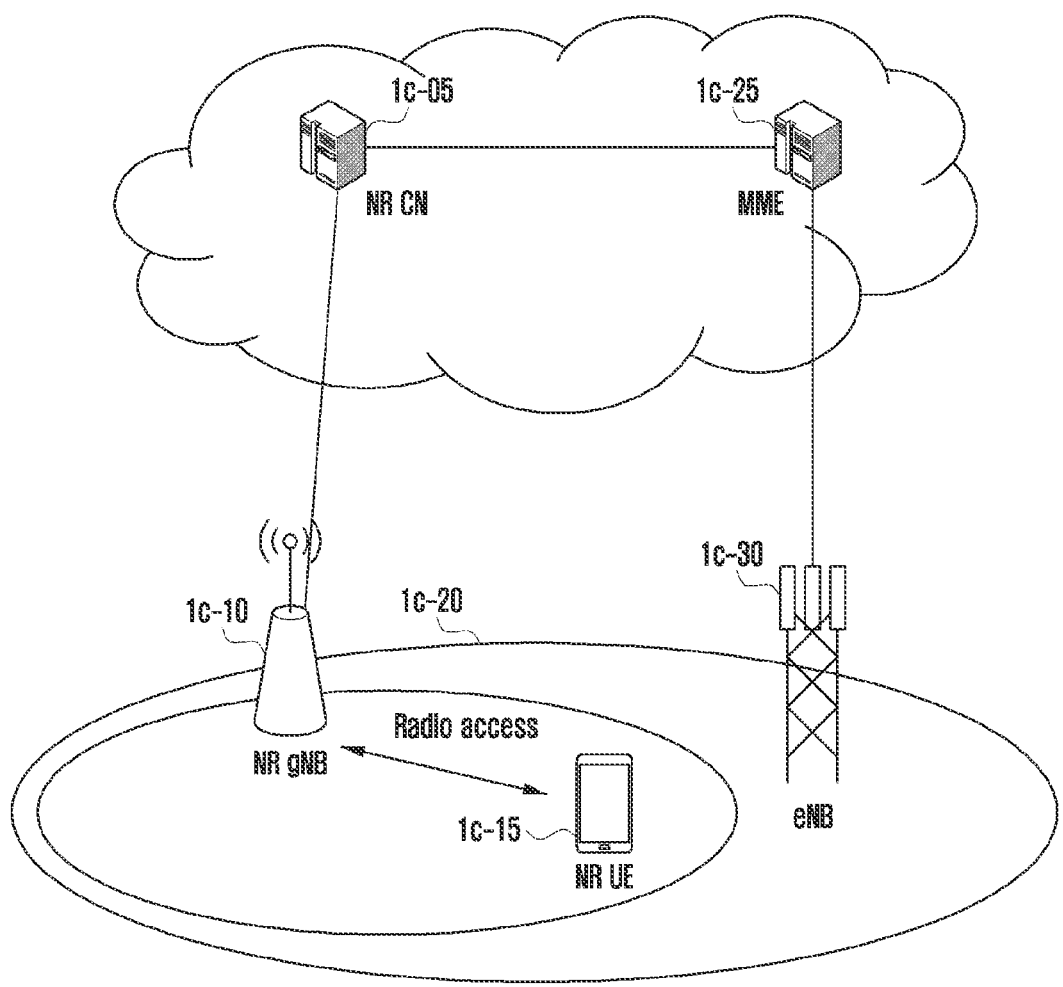
FIG. 3 is a diagram illustrating a structure of a next generation mobile communication system, according to an embodiment.

FIG. 3 is a diagram illustrating a structure of a next generation mobile communication system, according to an embodiment.

Referring to FIG. 3, the radio access network of the next generation mobile communication system (hereinafter, referred to as NR or 5G) is composed of a new radio Node B (hereinafter, referred to as NR gNB, or NR base station) 1c-10 and a new radio core network (NR CN) 1c-05. A new radio user equipment (NR UE or terminal) 1c-15 is connected to an external network via the NR gNB 1c-10 and the NR CN 1c-05.

In FIG. 3, the NR gNB 1c-10 may correspond to the eNB of the existing LTE system. The NR gNB 1c-10 may be connected to the NR UE 1c-15 via a radio channel and may provide a more superior service than the existing Node B. In the next generation mobile communication system, all user traffic can be serviced via a shared channel. Accordingly, a device for scheduling by collecting state information such as buffer states, available transmit power states, and channel states of the UEs may be needed, and the NR NB 1c-10 may be in charge of that. One NR gNB may control multiple cells. In the next mobile communication systems, in order to realize ultra-fast data transmission compared to the current LTE, a bandwidth of the current peak bandwidth or greater may be applied. In addition, a beamforming technique may be additionally used, using OFDM as a wireless access technique.

Additionally, according to an embodiment, the NR gNB may adopt an adaptive modulation and coding (AMC) scheme that determines a modulation scheme and a channel coding rate according to the channel state of the terminal. The NR CN 1c-05 may perform functions such as mobility support, bearer configuration, QoS configuration, and the like. The NR CN 1c-05, which is a device in charge of various control functions as well as a mobility management function for a terminal, may be connected to a plurality of base stations. In addition, the next generation mobile communication system may be interworked with the existing LTE systems, and the NR CN may be connected to an MME 1c-25 via a network interface. The MME may be connected to an eNB 1c-30 which is an existing base station.

Figure 4:
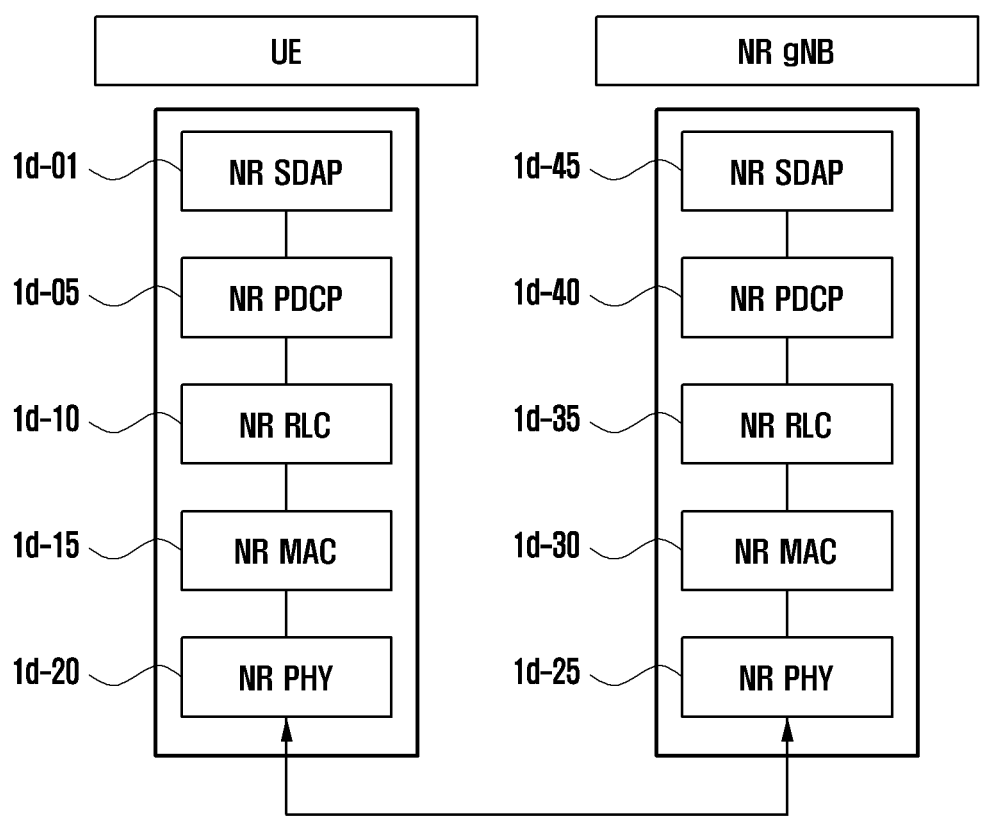
FIG. 4 is a diagram illustrating a wireless protocol structure of a next generation mobile communication system, according to an embodiment.

FIG. 4 is a diagram illustrating a wireless protocol structure of a next generation mobile communication system, according to an embodiment.

Referring to FIG. 4, the wireless protocol of the next generation mobile communication system includes service data adaptation protocol (SDAP) 1d-01 and 1d-45, NR PDCP 1d-05 and 1d-40, NR RLC 1d-10 and 1d-35, NR MAC 1d-15 and 1d-30, and NR PHY 2d-20 and 1d-25, in a terminal and an NR base station, respectively.

According to an embodiment, the main functions of the NR SDAPs 1d-01 and 1d-45 may include some of the following functions, but are not limited to the following examples.

Transfer of user plane data
Mapping between a QoS flow and a DRB for both DL and UL
Marking QoS flow ID in both DL and UL packets
Reflective QoS flow to DRB mapping for the UL SDAP PDUs For the SDAP layer device, the terminal may be configured to use the header of the SDAP layer device or to use the function of the SDAP layer device via a radio resource control (RRC) message for each PDCP layer device, for each bearer, or for each logical channel. When the SDAP header is configured, the SDAP layer device may instruct the terminal to update or reconfigure mapping information on uplink and downlink QoS flows and data bearers, for the terminal as a non-access stratum reflective quality of service (NAS reflective QoS) configuration 1-bit indicator and an access stratum reflective QoS (AS reflective QoS) configuration 1-bit indicator of the SDAP header. The SDAP header may include QoS flow ID information indicating QoS. QoS information may be used as data processing priority or scheduling information, for example, to support a smooth service.

According to an embodiment, the main function of the NR PDCP 1d-05 and 1d-40 may include some of the following functions, but are not limited to the following examples.

Header compression and decompression: ROHC only
Transfer of user data
In-sequence delivery of upper layer PDUs
Out-of-sequence delivery of upper layer PDUs
PDCP PDU reordering for reception
Duplicate detection of lower layer SDUs
Retransmission of PDCP SDUs
Ciphering and deciphering
Timer-based SDU discard in uplink In the above description, the reordering function of the NR PDCP device may refer to a function of reordering PDCP PDUs received in a lower layer in order based on a PDCP sequence number (SN). The reordering of the NR PDCP device may include a function of delivery data to a higher layer in a reordered order, may include a function of delivery directly without regard to the order, may include a function of recording the lost PDCP PDUs, may include a function of reporting the status of missing PDCP PDUs to the transmitter, and may include a function of requesting retransmission of the lost PDCP PDUs.

According to an embodiment, the main functions of the NR RLC 1d-10 and 1d-35 may include some of the following functions, but are not limited to the following examples.

Transfer of upper layer PDUs
In-sequence delivery of upper layer PDUs
Out-of-sequence delivery of upper layer PDUs
Error Correction through ARQ
Concatenation, segmentation and reassembly of RLC SDUs
Re-segmentation of RLC data PDUs
Reordering of RLC data PDUs
Duplicate detection
Protocol error detection
RLC SDU discard
RLC re-establishment In the above description, the in-sequence delivery of the NR RLC device may mean a function of sequentially delivering the RLC SDUs received from the lower layer to the upper layer. If an original RLC SDU is divided into multiple RLC SDUs and received, the in-sequence delivery of the NR RLC device may include a function of reassembling and delivering the same.

The in-sequence delivery of the NR RLC device may include reordering the received RLC PDUs, based on RLC SN or PDCP SN, may include reordering and recording lost RLC PDUs, may include sending a status report to the transmitting side for the lost RLC PDUs, and may include requesting retransmission for the lost RLC PDUs.

The in-sequence delivery of the NR RLC device may include delivering only RLC SDUs up to the lost RLC SDU to the upper layer in order, when there is a lost RLC SDU.

The in-sequence delivery of the NR RLC device may include delivering all received RLC SDUs to a higher layer in order before the timer starts, if a predetermined timer has expired, even if there is a lost RLC SDU.

The in-sequence delivery of the NR RLC device may include delivering all received RLC SDUs to the upper layer in order, if a predetermined timer expires, even if there are lost RLC SDUs.

The NR RLC device may process and deliver the RLC PDUs in the order of receiving to the NR PDCP device, i.e., out-of-sequence delivery.

When the NR RLC device receives a segment, the NR RLC device may receive segments stored in a buffer or to be received later, reconfigure them into an intact RLC PDU, and then deliver the RLC PDU to the NR PDCP device.

The NR RLC layer may not include a concatenation function, and may perform a function in the NR MAC layer or replace it with multiplexing of the NR MAC layer.

In the above description, the out-of-sequence delivery of the NR RLC device may mean a function of directly delivering the RLC SDUs received from the lower layer to the upper layer regardless of the order. The out-of-sequence delivery of the NR RLC device may include reassembling and delivering the original RLC SDU when it is divided into several RLC SDUs and received. The out-of-sequence delivery of the NR RLC device may include storing the RLC SNs or PDCP SNs of the received RLC PDUs and ordering them to record the lost RLC PDUs.

According to an embodiment, the NR MAC 1d-15 and 1d-30 may be connected to several NR RLC layer devices configured in one terminal, and the main function of the NR MAC may include some of the following functions, but are not limited to the following examples.

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding The NR PHY layers 1d-20 and 1d-25 may perform operations of channel-coding and modulating the upper layer data, making the same into an OFDM symbol and transmitting the same via a radio channel, or operations of demodulating and channel-decoding the OFDM symbol received via the radio channel and delivering the same to the upper layer.

Figure 5:
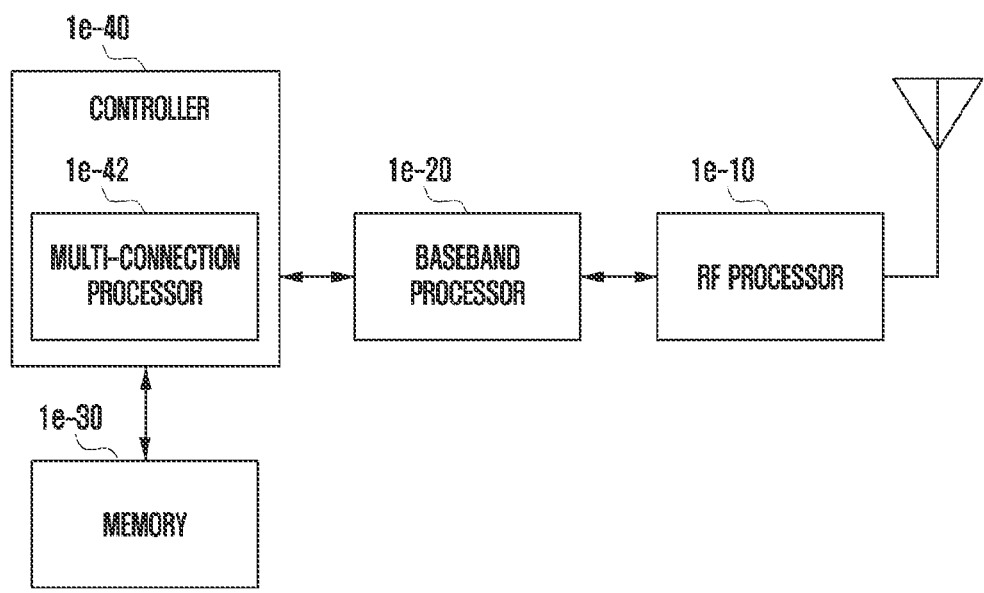
FIG. 5 is a block diagram illustrating an internal structure of a terminal, according to an embodiment.

FIG. 5 is a block diagram illustrating an internal structure of a terminal, according to an embodiment.

Referring to FIG. 5, the terminal includes a radio frequency (RF) processor 1e-10, a baseband processor 1e-20, a storage unit or memory 1e-30, and a controller (or processor) 1e-40. The disclosure is not limited to this embodiment, and the terminal may include fewer or more components than the configuration shown in FIG. 5.

The RF processor 1e-10 may perform functions for transmitting and receiving signals via a radio channel, such as, for example, band conversion and amplification of signals. That is, the RF processor 1e-10 may up-convert a baseband signal provided from the baseband processor 1e-20 into an RF band signal and transmit the RF band signal through an antenna, and may down-convert the RF band signal received through the antenna into a baseband signal. For example, the RF processor 1e-10 may include a transmitting filter, a receiving filter, an amplifier, a mixer, an oscillator, a digital to analog converter (DAC), an analog to digital converter (ADC), and the like. The disclosure is not limited to this embodiment. In FIG. 5, only one antenna is shown, but the terminal may include a plurality of antennas. In addition, the RF processor 1e-10 may include a plurality of RF chains. In addition, the RF processor 1e-10 may perform beamforming. For beamforming, the RF processor 1e-10 may adjust the phase and magnitude of each of signals transmitted and received through a plurality of antennas or antenna elements. In addition, the RF processor 1e-10 may perform MIMO, and may receive multiple layers when performing the MIMO operation.

The baseband processor 1e-20 may perform a conversion function between a baseband signal and a bit stream according to the physical layer standard of the system. For example, when transmitting data, the baseband processor 1e-20 may generate complex symbols by encoding and modulating a transmission bit stream. In addition, when receiving data, the baseband processor 1e-20 may restore the received bit stream by demodulating and decoding the baseband signal provided from the RF processor 1e-10. For example, in an OFDM scheme, when transmitting data, the baseband processor 1e-20 may generate complex symbols by encoding and modulating a transmission bit stream, mapping the complex symbols to subcarriers, and then performing an inverse fast Fourier transform (IFFT) operation and cyclic prefix (CP) insertion to configure the OFDM symbols. In addition, when receiving data, the baseband processor 1e-20 may divide the baseband signal provided from the RF processor 1e-10 into OFDM symbol units and restore signals mapped to subcarriers through a fast Fourier transform (FFT). Thereafter, the received bit stream may be restored by demodulating and decoding.

The baseband processor 1e-20 and the RF processor 1e-10 transmit and receive signals as described above. The baseband processor 1e-20 and the RF processor 1e-10 may be referred to as a transmitter, a receiver, a transceiver, or a communicator. Furthermore, at least one of the baseband processor 1e-20 and the RF processor 1e-10 may include a plurality of communication modules to support a plurality of different radio access techniques. In addition, at least one of the baseband processor 1e-20 and the RF processor 1e-10 may include different communication modules to process signals of different frequency bands. For example, the different radio access techniques may include a wireless LAN (e.g., IEEE 802.11), a cellular network (e.g., LTE), and the like. In addition, the different frequency bands may include a super high frequency (SHF) (e.g., 2.NRHz) band, and a millimeter wave (e.g., 60 GHz) band. The terminal may transmit and receive signals to and from the base station using the baseband processor 1e-20 and the RF processor 1e-10m and the signal may include control information and data.

The storage unit 1e-30 may store data such as, for example, a basic program, an application program, and configuration information for the operation of the terminal. In particular, the storage unit 1e-30 may store information related to a second access node that performs wireless communication using a second radio access technique. The storage unit 1e-30 may provide the stored data according to the request of the controller 1e-40. The storage unit 1e-30 may be composed of a storage medium such as a ROM, a RAM, a hard disk, a CD-ROM, a DVD, and the like or a combination of storage media. In addition, the storage unit 1e-30 may be composed of a plurality of memories.

Figure 6:
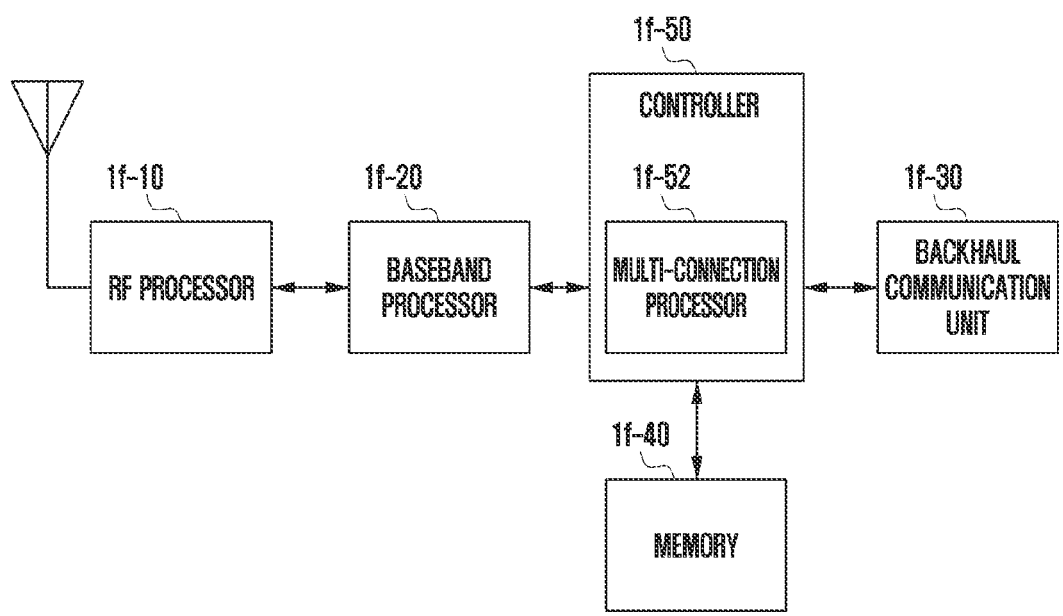
FIG. 6 is a block diagram illustrating a configuration of an NR base station, according to an embodiment.

The controller 1e-40 may control overall operations of the terminal. For example, the controller 1e-40 may transmit and receive signals through the baseband processor 1e-20 and the RF processor 1e-10. In addition, the controller 1e-40 may write and read out data in and from the storage unit 1e-30. To this end, the controller 1e-40 may include at least one processor. For example, the controller 1e-40 may include a communication processor (CP) for performing control for communication and an application processor (AP) for controlling a higher layer such as an application program. In addition, at least one component in the terminal may be implemented with one chip. FIG. 6 is a block diagram illustrating a configuration of an NR base station, according to an embodiment of the present disclosure.

Referring to FIG. 6, the base station includes an RF processor 1f-10, a baseband processor 1f-20, a backhaul communication unit 1f-30, a storage unit or memory 1f-40, and a controller (or processor) 1f-50. The disclosure is not limited to this embodiment, and the base station may include fewer or more components than the configuration shown in FIG. 6.

The RF processor 1f-10 may perform band conversion and amplification of signals for transmitting and receiving the signals via a radio channel. That is, the RF processor 1f-10 may up-convert the baseband signal provided from the baseband processor 1f-20 into an RF band signal and transmit the same through an antenna, and may down-convert the RF band signal received through the antenna into a baseband signal. For example, the RF processor 1f-10 may include a transmission filter, a reception filter, an amplifier, a mixer, an oscillator, a DAC, an ADC, and the like. In FIG. 6, only one antenna is shown, but the RF processor 1f-10 may include a plurality of antennas. In addition, the RF processor 1f-10 may include a plurality of RF chains. In addition, the RF processor 1f-10 may perform beamforming. For beamforming, the RF processor 1f-10 may adjust the phase and magnitude of each of signals transmitted and received through a plurality of antennas or antenna elements. The RF processor 1f-10 may perform a down MIMO operation by transmitting one or more layers.

The baseband processor 1f-20 may perform a conversion function between the baseband signal and the bit stream according to the physical layer standard of a first radio access technique. For example, when transmitting data, the baseband processor 1f-20 may generate complex symbols by encoding and modulating a transmission bit stream. In addition, when receiving data, the baseband processor 1f-20 may restore the received bit stream by demodulating and decoding the baseband signal provided from the RF processor 1f-10. For example, according to the OFDM scheme, when transmitting data, the baseband processor 1f-20 may generate complex symbols by encoding and modulating a transmission bit stream, map the complex symbols to subcarriers, and then perform an IFFT operation and CP insertion to configure the OFDM symbols. In addition, when receiving data, the baseband processor 1f-20 may divide the baseband signal provided from the RF processor 1f-10 into OFDM symbol units and restore signals mapped to subcarriers through a FFT. Thereafter, the received bit stream may be restored by demodulating and decoding. The baseband processor 1f-20 and the RF processor 1f-10 may transmit and receive signals as described above. Accordingly, the baseband processor 1f-20 and the RF processor 1f-10 may be referred to as a transmitter, a receiver, a transceiver, or a wireless communicator. The base station may transmit and receive signals with a terminal using the baseband processor 1f-20 and the RF processor 1f-10, and the signals may include control information and data.

The backhaul communication unit 1f-30 may provide an interface for communicating with other nodes in a network. That is, the backhaul communication unit 1f-30 may convert a bit stream transmitted from a main base station to another node, for example, an auxiliary base station or a core network, into a physical signal and may convert a physical signal received from another node into a bit stream. The backhaul communication unit 1f-30 may be included in the communication unit.

The storage unit 1f-40 may store data such as a basic program, an application program, and configuration information for the operation of the terminal. The storage unit 1f-40 may store information on a bearer allocated to the connected terminal, a measurement result reported from the connected terminal, and the like. In addition, the storage unit 1f-40 may store information that is a reference for determining whether to provide or terminate multiple connections to the terminal. The storage unit 1f-40 may provide the stored data according to the request of the controller 1f-50. The storage unit 1f-40 may include a storage medium such as a ROM, a RAM, a HARD DISK, a CD-ROM, a DVD, and the like or a combination of storage media. In addition, the storage unit 1f-40 may be composed of a plurality of memories. According to some embodiments, the storage unit 1f-40 may store a program for performing a buffer status reporting method according to the disclosure.

The controller 1f-50 may control overall operations of the base station. For example, the controller 1f-50 may transmit and receive a signal through the baseband processor 1f-20 and the RF processor 1f-10 or through the backhaul communication unit 1f-30. In addition, the controller 1f-50 may write and read out data in and from the storage unit 1f-40. To this end, the controller 1f-50 may include at least one processor. In addition, at least one component in the base station may be implemented with one chip.

Figure 7:
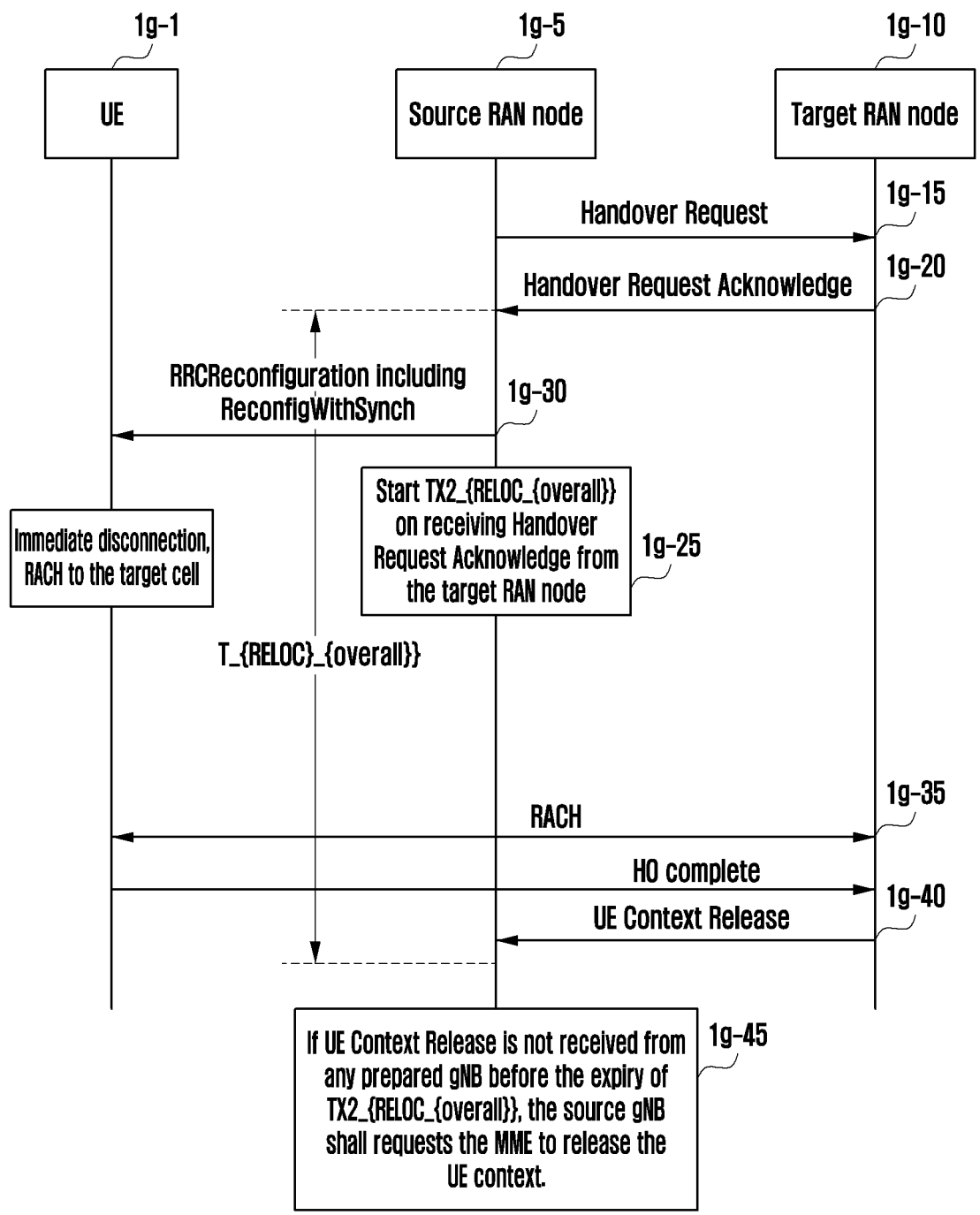
FIG. 7 is a diagram illustrating a handover operation in LTE and NR.

FIG. 7 is a diagram illustrating a handover operation in LTE and NR.

A terminal 1g-1 has a connection state with a serving base station 1g-5 including a serving cell. When a handover request message is transmitted to a base station 1g-10 of a target cell according to the determination of the serving cell. at 1g-15, the target base station 1g-10 performs admission control and transmits a handover request ACK message, which attaches a configuration value of a resource to be used for a handover, to the serving base station 1g-5 again, at 1g-20. When the serving base station 1g-5 receives this message, if a predetermined timer is started at 1g-25 and a UE context release message 1g-40 is not delivered from the target base station 1g-10 until the timer expires, the serving base station 1g-5 can request the UE context release directly to the MME or an access and mobility management function (AMF), at 1g-45. The serving base station 1g-5 that has received the handover request ACK message inserts a HO command into an RRC reconfiguration message and transmits it to the terminal 1g-1, at 1g-30, and the terminal 1g-1 that has received the message disconnects the serving cell and performs random access (RA), based on the target cell information present in the HO command. When the UL grant is obtained through the RA, at 1g-35, the target cell may request UE context release from the source base station again by transmitting an HO complete message to the target cell, at 1g-40.

Figure 8:
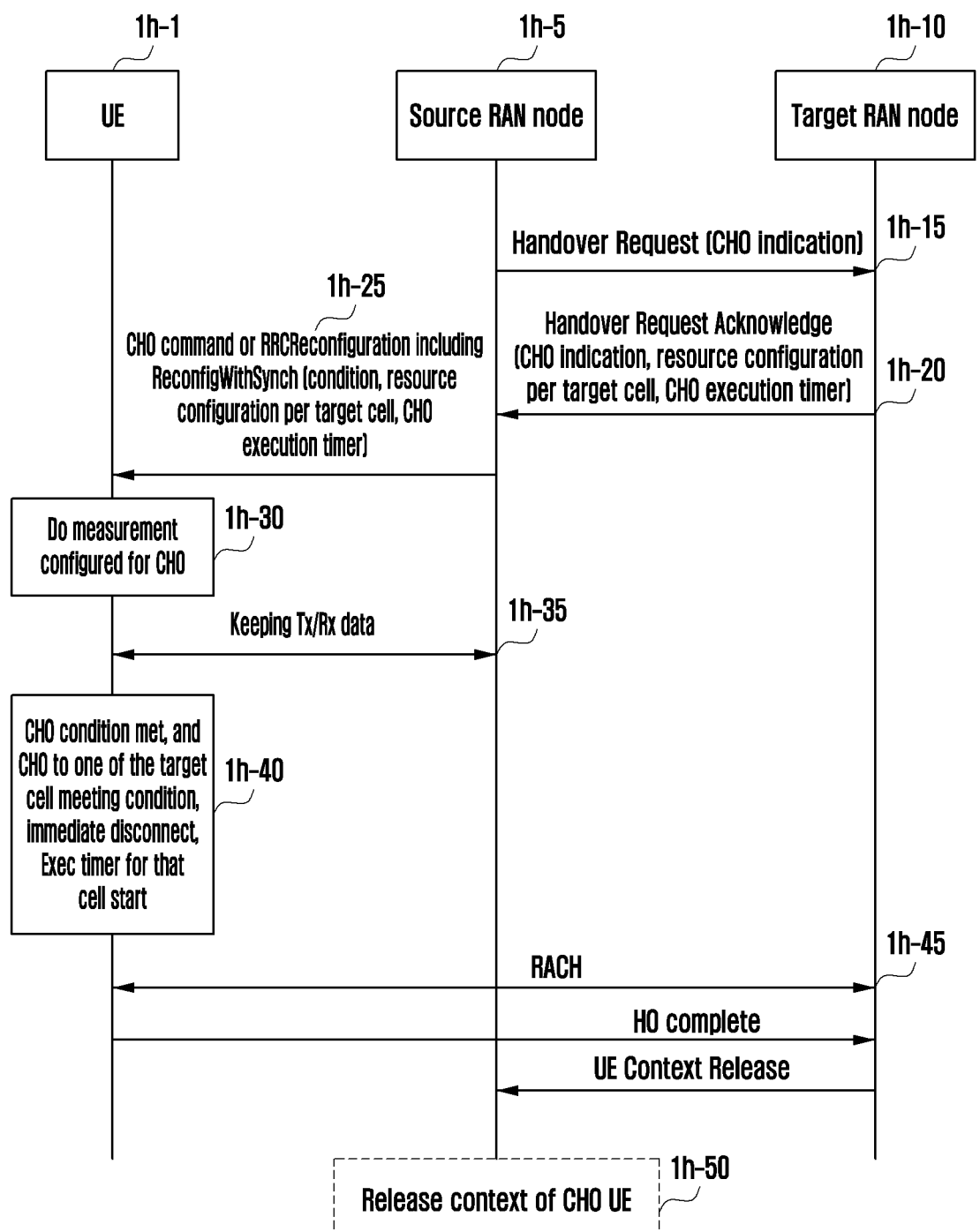
FIG. 8 is a diagram illustrating a conditional handover success operation in the case of configuring operation of a conditional handover via a network signal, according to an embodiment.

FIG. 8 is a diagram illustrating a conditional handover success operation in the case of configuration operation of a conditional handover via a network signal, according to an embodiment.

A terminal 1h-1 has a connection state with a serving base station 1h-5 including a serving cell. When a handover request message including a factor distinguishable as a CHO is transmitted to a base station 1h-10 of a target cell according to the determination of the serving cell, at 1h-15, the target base station 1h-10 performs admission control, and the handover request ACK message to which the resource configuration value to be used for a handover is attached is transmitted to a serving base station 1h-5 again, at 1h-20. CHO information included in the HO request ACK message may be a condition used as a trigger condition when performing a CHO in the corresponding target cell, identification information of a target candidate cell, for example, physical cell identifier (PCI), cell global identifier (CGI), node ID, etc., radio resource configuration information to be used by the terminal after the CHO in each candidate target cell, a timer for determining failure when performing CHO (CHO execution timer) information, etc.

These pieces of information may be configured for every candidate target cell and transmitted to the serving base station, or the configuration information shared or used in common by a plurality of candidate target cells may be configured as a representative value and transmitted to the serving base station.

The serving base station 1h-5 that has received the message transmits an RRC reconfiguration message including a reconfiguration With Sync IE or an HO command message to the terminal 1h-1, at 1h-25. In this message, the information received at 1h-20 may be transmitted as it is, and additionally, a condition for performing CHO to a specific target cell may be added. Here, the condition may be composed of a measurement object and a report configuration.

The terminal 1h-1 that has received the message performs measurement corresponding to the condition included in the message, and monitors whether an event given as a condition occurs, at 1g-30.

During this period, the terminal 1h-1 performs a general data transmission/reception operation with the serving cell, at 1h-35.

Then, if the event given for the CHO is satisfied, the CHO is executed with one of the candidate targets that meet the given event. Execution operation may include immediate disconnection from the serving cell, configuration according to the reconfiguration With Sync configuration information of the target cell executing the CHO, starting of a CHO execution timer given to the target cell, RA to the corresponding target cell, and transmitting an HO complete (alternately, RRC reconfiguration complete) message when RA succeeds, at 1h-40.

Until the expiration of the CHO execution timer started in the above step, the terminal 1h-1 performs RA to the selected candidate target cell, at 1h-45. If the terminal 1h-1 receives random access response (RAR) and succeeds in RA or if the terminal 1h-1 transmits the HO complete message and the CHO succeeds, the CHO execution timer is terminated, at 1h-45.

The target base station 1h-10 may transmit the UE context to the source base station 1h-5, and the serving base station 1h-5 may release the UE context at 1h-50.

Figure 9:
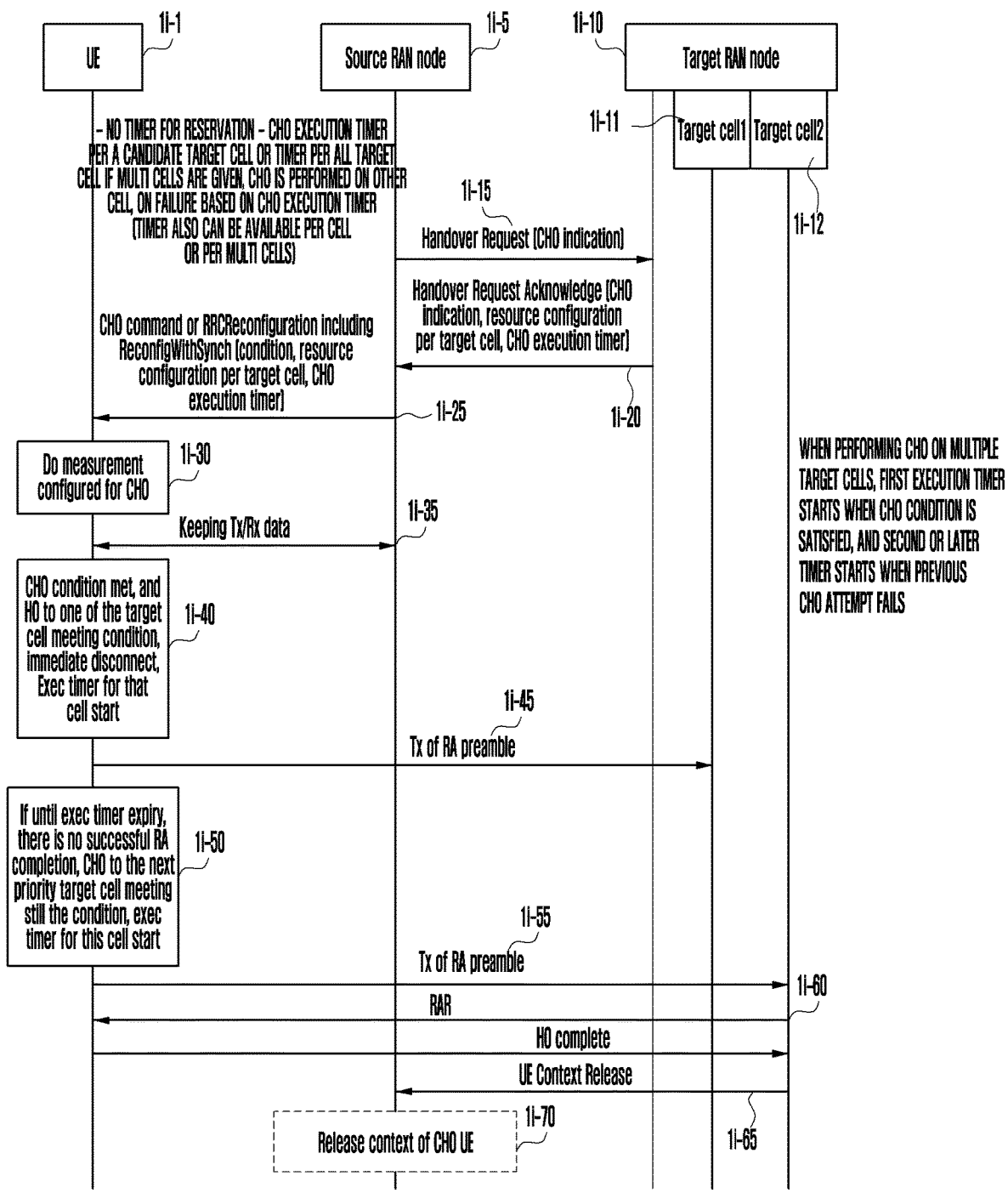
FIG. 9 is a diagram illustrating a case of attempting to connect to multiple candidate target cells during a conditional handover success operation in the case of configuration operation of a conditional handover via a network signal, according to an embodiment.

FIG. 9 is a diagram illustrating a case of attempting to connect to multiple candidate target cells during a conditional handover success operation in the case of configuration operation of a conditional handover via a network signal, according to an embodiment.

A terminal 1i-1 has a connection state with a serving base station 1i-5 including a serving cell. When a handover request message including a factor distinguishable as a CHO is transmitted to a base station 1i-10 of multiple target cells 1i-11 and 1i-12 according to the determination of the serving cell, at 1i-15, a target base station 1i-10 performs admission control and delivers a handover request ACK message attached with a configuration value of a resource to be used for a handover to a serving base station 1i-5 again, at 1i-20. At this time, the information for CHO included in the HO request ACK message may be a condition used as a trigger condition when performing CHO to the corresponding target cell, identification information of the target candidate cell, for example, PCI, CGI, node ID, etc., radio resource configuration information to be used after the CHO in each candidate target cell, timer (CHO execution timer) information for failure determination when performing CHO, etc. This information may be transferred for each candidate target cell, or the configuration information used in common for a plurality of candidate target cells may be transferred as a representative value.

The serving base station 1i-5 that has received the message delivers an RRC reconfiguration message including a reconfiguration With Sync IE or an HO command message to the terminal 1i-1, at 1i-25. In this message, the information received at 1i-20 may be delivered as it is, and additionally, a condition for performing CHO to a specific target cell may be added. Here, the condition may be composed of a measurement object and a report configuration.

The terminal 1i-1 that has received the message performs measurement corresponding to the condition included in the message, and monitors whether an event given as a condition occurs, at 1i-30.

During this period, the terminal 1i-1 performs a general data transmission/reception operation with the serving cell, at 1i-35.

Then, if the event given for the CHO is satisfied, the CHO is executed with one of the candidate targets that meet the given event. Execution operation may include immediate disconnection from the serving cell, configuration according to the reconfiguration With Sync configuration information of the target cell executing the CHO, starting of the given CHO execution timer to the target cell, RA to the corresponding target cell, and transmitting an HO complete (alternately, RRC Reconfiguration complete) message upon success of RA. In this example, target cell 1 1i-11 is selected as a CHO target, at 1i-40.

The terminal 1i-1 transmits an RA preamble to the selected target cell 1i-11, at 1i-45.

Until the expiration of the CHO execution timer started at 1i-40, the terminal 1i-1 performs RA to the selected candidate target cell and does not succeed in the RA; and if there is another cell that still satisfies the event satisfied at 1i-40 among the candidate target cells given at 1i-25, the terminal 1i-1 performs the CHO again to the cell of the next priority among the cells. The CHO execution timer can also be restarted. When one timer value is transferred at 1i-25, the same timer value is applied to all target cells, and when a timer value is transferred for each cell, the timer value appropriate for the cell is applied. In this example, target cell 2 1i-12 is selected as the next CHO target, at 1i-50.

The terminal 1i-1 transmits the RA preamble to cell 2, at 1i-55, and receives a response RAR, at 1i-60. When the HO complete message is transmitted to cell 2 for the UL resource granted to the RAR, the base station of the target cell 2 transfers the UE context release to a source cell base station, at 1i-65, and the source cell base station releases the context of the terminal, at 1i-70.

Figure 10:
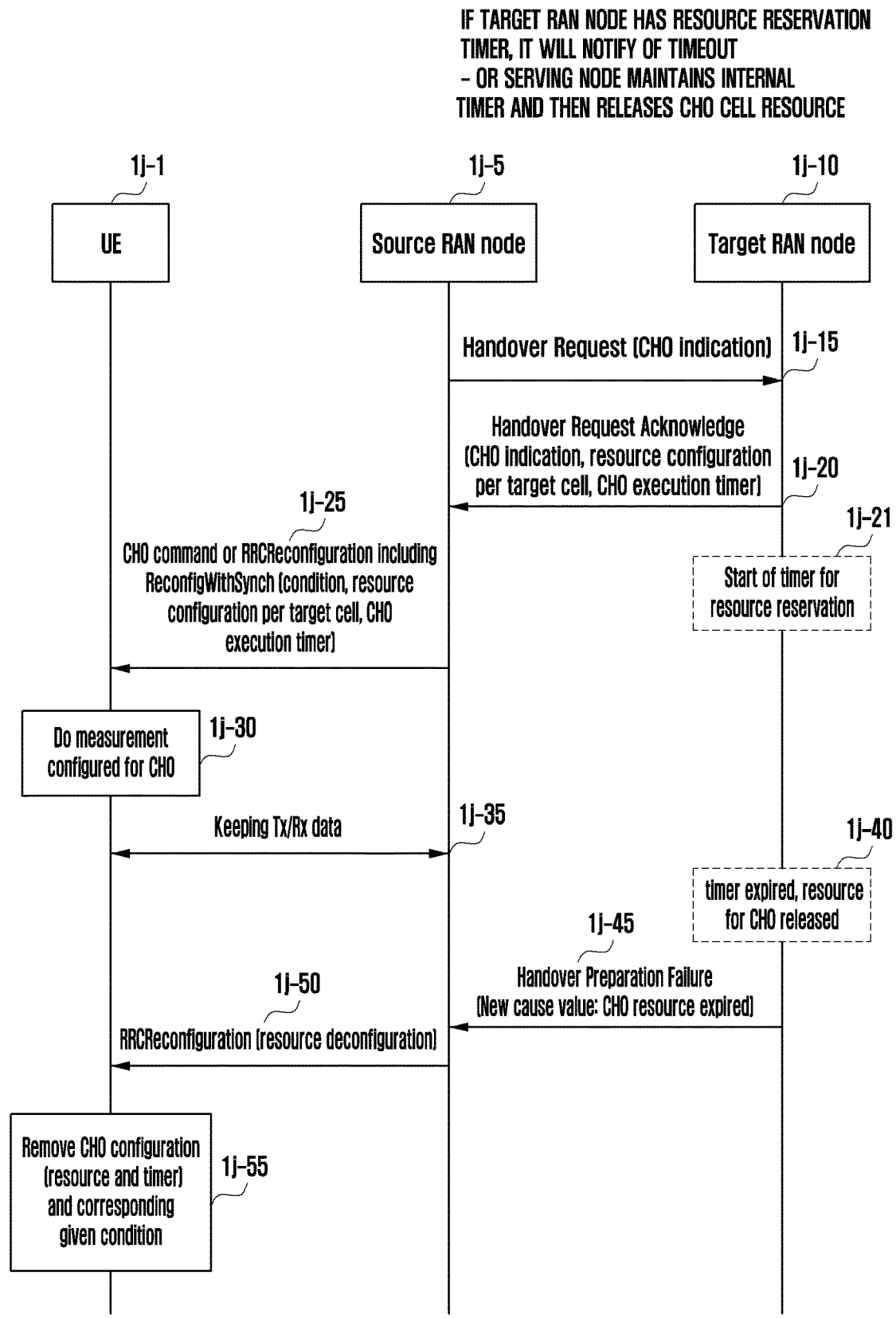
FIG. 10 is a diagram illustrating a case of configuration removal of a conditional handover via a network signal, according to an embodiment.

FIG. 10 is a diagram illustrating a case of configuration removal of a conditional handover via a network signal, according to an embodiment.

A terminal 1j-1 has a connection state with a serving base station 1j-5 including a serving cell. When a handover request message including a factor distinguishable as a CHO is transmitted to a base station 1j-10 of a target cell according to the determination of the serving cell, at 1j-15, a target base station 1j-10 performs admission control and transfers a handover request ACK message attached with a configuration value of a resource to be used for a handover to the serving base station 1j-5, at (1j-20). The information for CHO included in the HO request ACK message may be a condition used as a trigger condition when performing CHO in the corresponding target cell, identification information of the target candidate cell, for example, PCI, CGI, node ID, etc., radio resource configuration information to be used by the terminal after the CHO in each candidate target cell, CHO execution timer information for failure determination when performing CHO, etc. These pieces of information may be configured for every candidate target cell and transmitted to the serving base station, or the configuration information shared or used in common by a plurality of candidate target cells may be configured as a representative value and transmitted to the serving base station.

The target base station 1*j*-10 may start an internal timer while starting resource reservation of the target candidate cells, at 1*j*-21.

The serving base station 1*j*-5 that has received the message transfers an RRC reconfiguration message including a reconfiguration With Sync IE or an HO command message to the terminal 1*j*-1, at 1*j*-25. In this message, the information received at 1*i*-20 may be transferred as it is, and additionally, a condition for performing CHO to a specific target cell may be added. Here, the condition may be composed of a measurement object and a report configuration.

The terminal 1*j*-1 that has received the message performs measurement corresponding to the condition included in the message and monitors whether an event given as a condition occurs, at 1*j*-30.

During this period, the terminal 1*j*-1 performs a general data transmission/reception operation with the serving cell, at 1*j*-35.

When the resource allocation timer used for CHO in the target base station 1*j*-10 operating the candidate target cell of the CHO expires, at 1*j*-40, the target base station 1*j*-10 may indicate and transfer the previously configured CHO resource expiration in the handover preparation failure message to the source base station 1*j*-5, at 1*j*-45.

The source base station 1*j*-5 that has received the information may send a configuration for releasing the CHO configuration given to a specific target cell in an RRC reconfiguration message, at 1*j*-50.

In another embodiment, a serving node may receive the message at 1*j*-20 and start a timer on its own, and if the self-running timer expires without the message at 1*j*-45 at the target node while the timer is running, the serving node may perform the operation of 1*j*-50.

The terminal 1*j*-1 that has received this configuration releases resource configuration information, radio configuration information, and measurement configuration information given for a condition associated with the corresponding target cell, and stops the measurement operation of the CHO associated with the target cell, at 1*j*-55.

Figure 11:
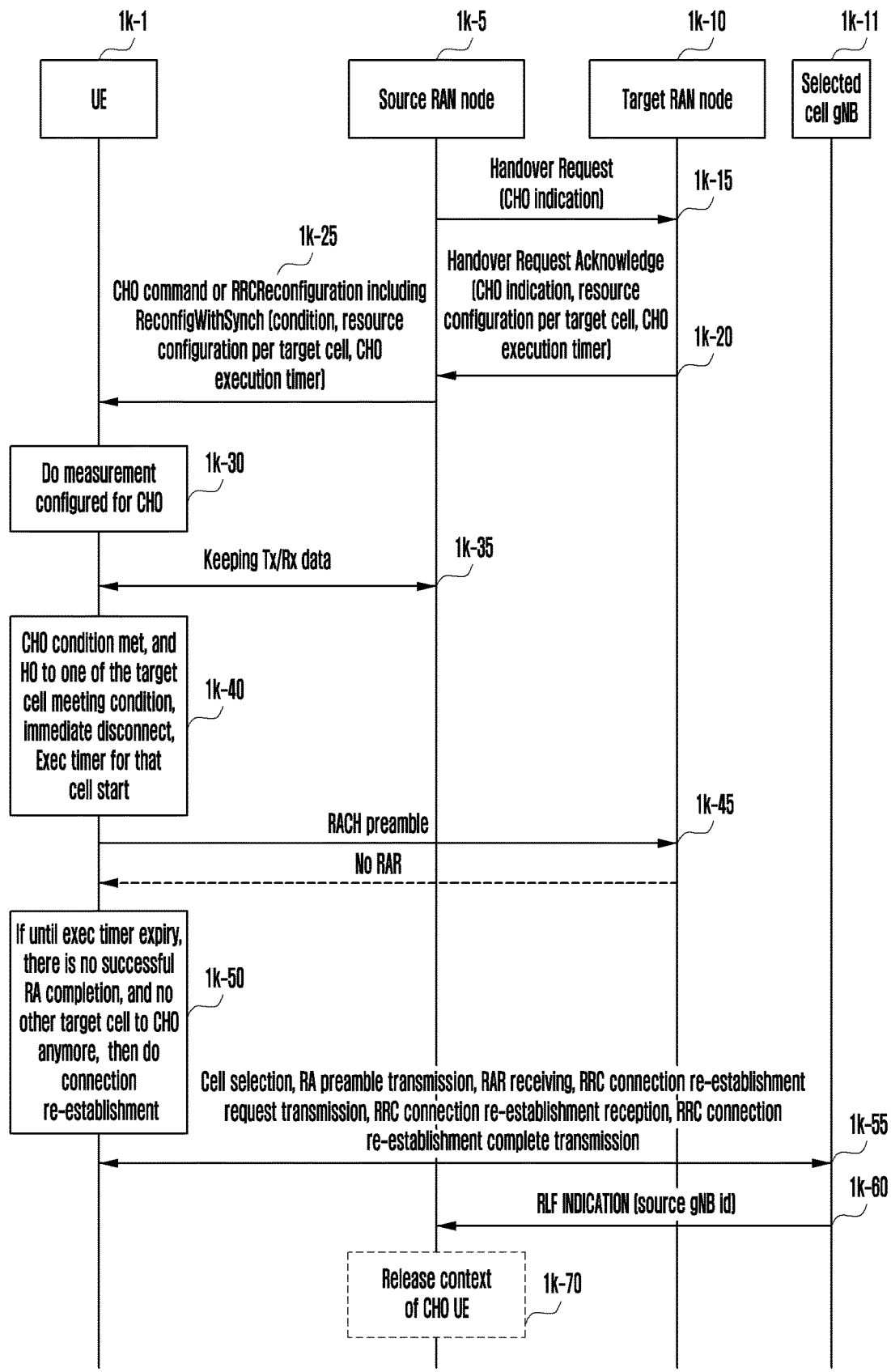
FIG. 11 is a diagram illustrating a case of conditional handover failure, in the case of configuration operation of a conditional handover via a network signal, according to an embodiment.

FIG. 11 is a diagram illustrating a case of conditional handover failure, in the case of configuration operation of a conditional handover via a network signal, according to an embodiment.

A terminal 1*k*-1 has a connection state with a serving base station 1*k*-5 including a serving cell. When a handover request message including a factor distinguishable as a CHO is transferred to a base station 1*k*-10 of a target cell according to the determination of the serving cell, at 1*k*-15, a target base station 1*k*-10 performs admission control and transfers a handover request ACK message attached with a configuration value of a resource to be used for a handover to the serving base station 1*k*-5 again, at 1*k*-20. The information for CHO included in the HO request ACK message may be a condition used as a trigger condition when performing a CHO in the corresponding target cell, identification information of the target candidate cell, for example, PCI, CGI, node ID, etc., radio resource configuration information to be used by the terminal after CHO in each candidate target cell, CHO execution timer information for failure determination when performing CHO, etc. These pieces of information may be configured for every candidate target cell and transmitted to the serving base station, or the configuration information shared or used in common by a plurality of candidate target cells may be configured as a representative value and transmitted to the serving base station.

At this time, although not shown in FIG. 11, the target base station 1*k*-10 may start an internal timer while starting resource reservation of the target candidate cells. Operation 1*j*-21 of FIG. 10 may be referred to.

The serving base station 1*k*-5 that has received the message transfers an RRC reconfiguration message including a reconfiguration With Sync IE or an HO command message to the terminal 1*k*-1, at 1*k*-25. In this message, the information received at 1*k*-20 may be transferred as it is, and additionally, a condition for performing CHO to a specific target cell may be added. Here, the condition may be composed of a measurement object and a report configuration.

The terminal 1*k*-1 that has received the message performs measurement corresponding to the condition included in the message, and monitors whether an event given as a condition occurs, at 1*k*-30.

During this period, the terminal 1*k*-1 performs a general data transmission/reception operation with the serving cell, at 1*k*-35.

Then, if the event given for the CHO is satisfied, the CHO is executed with one of the candidate targets that meet the given event. Execution operation may include immediate disconnection from the serving cell, configuration according to the reconfiguration With Sync configuration information of the target cell executing CHO, starting of the given CHO execution timer to the target cell, RA to the corresponding target cell, and transmitting an HO complete (alternately RRC Reconfiguration complete) message upon success of RA, at 1*k*-40.

The terminal 1*k*-1 transmits an RA preamble to the selected target cell, at 1*k*-45.

If the RA started with the selected target cell is not successful until the CHO execution timer started in operation 1*k*-40 expires, and if no candidate target cell is given in the CHO configuration, or there are no cells satisfying the event satisfied in the current operation 1*k*-40 even if the candidate target cell exists among the candidate target cells, the terminal 1*k*-1 performs an RRC connection re-establishment procedure, at 1*k*-50.

The connection re-establishment procedure may consist of cell selection, RA preamble transmission, RAR receiving, RRC connection re-establishment request transmission, RRC connection re-establishment reception, and RRC connection re-establishment complete transmission, at 1*k*-55.

Upon success, a radio link failure (RLF) indication may be transmitted from a cell 1*k*-11 selected by performing RRC connection re-establishment (RRE) to the source node, at 1*k*-60, thereby removing the UE context from the source node, at 1*k*-70.

Figure 12:
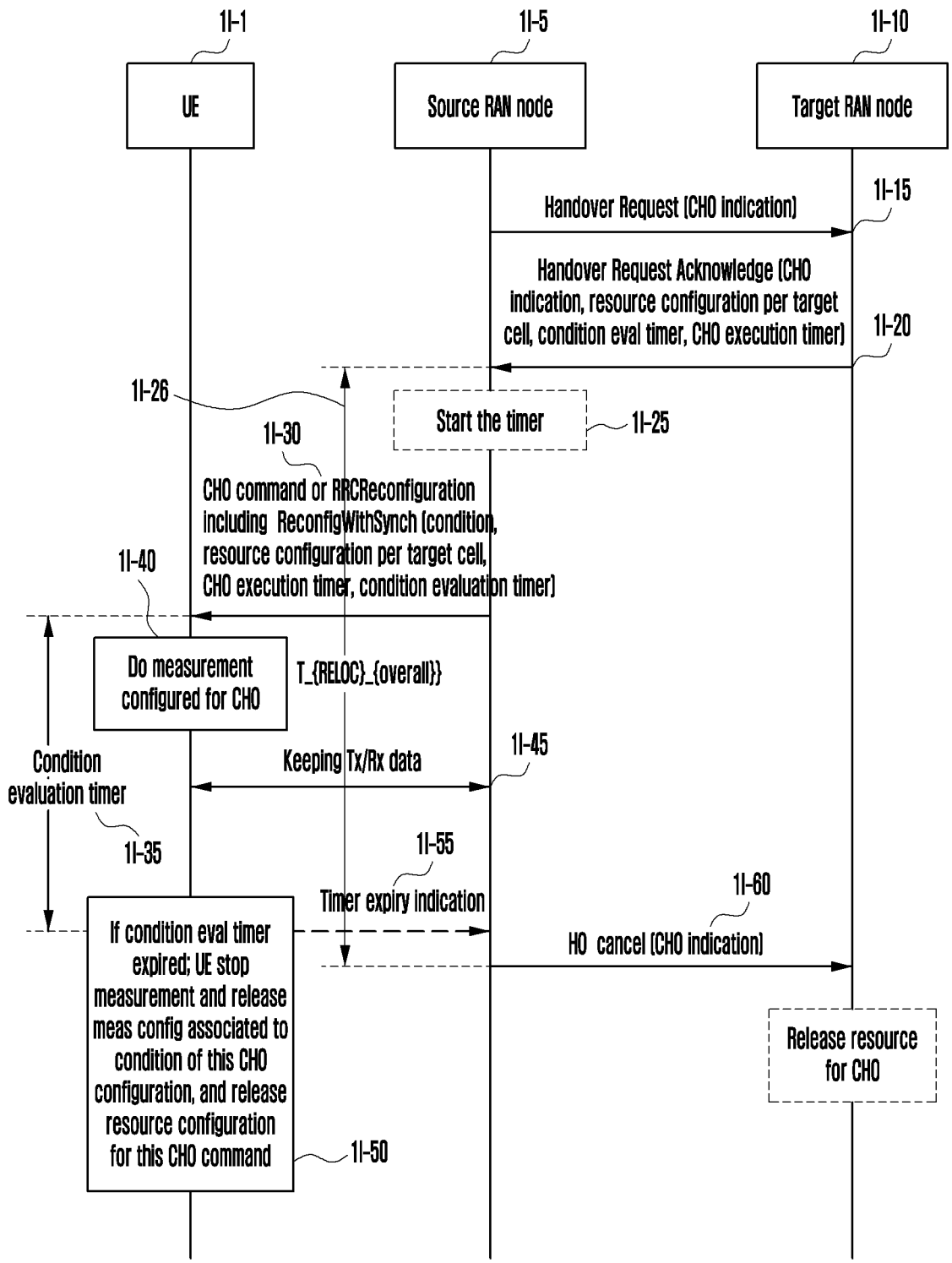
FIG. 12 is a diagram illustrating a case of configuration removal due to timer expiration, in the case of configuration operation of a conditional handover through a timer, according to an embodiment.

FIG. 12 is a diagram illustrating a case of configuring removal due to a timer expiration, in the case of configuration operation of a conditional handover through a timer, according to an embodiment.

A terminal 1*l*-1 has a connection state with a serving base station 1*l*-5 including a serving cell. When a handover request message including a factor distinguishable as a CHO is transferred to a base station 1*l*-10 of a target cell according to the determination of the serving cell, at 1*l*-15, a target base station 1*l*-10 performs admission control and transfers a handover request ACK message attached with a configuration value of a resource to be used for a handover to the serving base station again, at 1*l*-20. At this time, the information for CHO included in the HO request ACK message may be a condition used as a trigger condition when performing a CHO in the corresponding target cell, identification information of the target candidate cell, for example, PCI, CGI, node ID, etc., radio resource configuration information to be used by the terminal after the CHO in each candidate target cell, CHO execution timer information for failure determination when performing CHO, resource operation timer (conditional evaluation timer) information for CHO operated by the node, etc. These pieces of information may be configured for every candidate target cell and transmitted to the serving base station, or the configuration information shared or used in common by a plurality of candidate target cells may be configured as a representative value and transmitted to the serving base station.

When a source node receives the message, the source node 1*l*-5 may start a timer corresponding to a conditional evaluation timer, at 1*l*-25. If the source node 1*l*-5 does not receive a UE context release message from a target node until this timer expires, at 1*l*-26, the resource indication information configured for CHO may be included in the HO cancel message and transferred to the target node. The target node 1*l*-10 that has received the information may release the resources that have been configured for CHO, at 1*l*-60.

The serving base station 1*l*-5 that has received the message of 1*l*-20 transfers an RRC reconfiguration message including a reconfiguration With Sync IE or an HO command message to the terminal 1*l*-1, at 1*l*-30. In this response, the information received at 1*l*-20 may be transferred as it is, and additionally, a condition for performing CHO to a specific target cell may be added. Here, the condition may be composed of a measurement object and a report configuration.

The terminal 1*l*-1 that has received the message at 1*l*-30 starts the condition evaluation timer configured therein, at 1*l*-35.

In addition, the terminal 1*l*-1 that has received the message of 1*l*-30 performs measurement corresponding to the condition included in the message, and monitors whether an event given as a condition occurs, at 1*l*-40.

During this period, the terminal 1*l*-1 performs a general data transmission/reception operation with the serving cell 1*l*-5, at 1*l*-45.

If the event for the CHO has not been satisfied until the condition evaluation timer expires, the terminal may stop all the configurations and operations configured for the CHO. That is, the measurement configuration for the CHO condition may be cleared and the measurement operation may be stopped. In addition, resource configuration and radio configuration values to be applied to target cells may be released, at 1*l*-50.

In addition, if the evaluation timer expires, the terminal 1*l*-1 may inform the serving cell 1*l*-5 of the expiration of the timer using RRC or MAC CE, at 1*l*-55.

When the source node receives the transferred timer expiration, the source node 1*l*-5 may transmit a message for releasing the target cell resource of the CHO configured for the UE 1-1 included in the HO cancel message to the target node 1*l*-10, at 1*l*-60.

Figure 13:
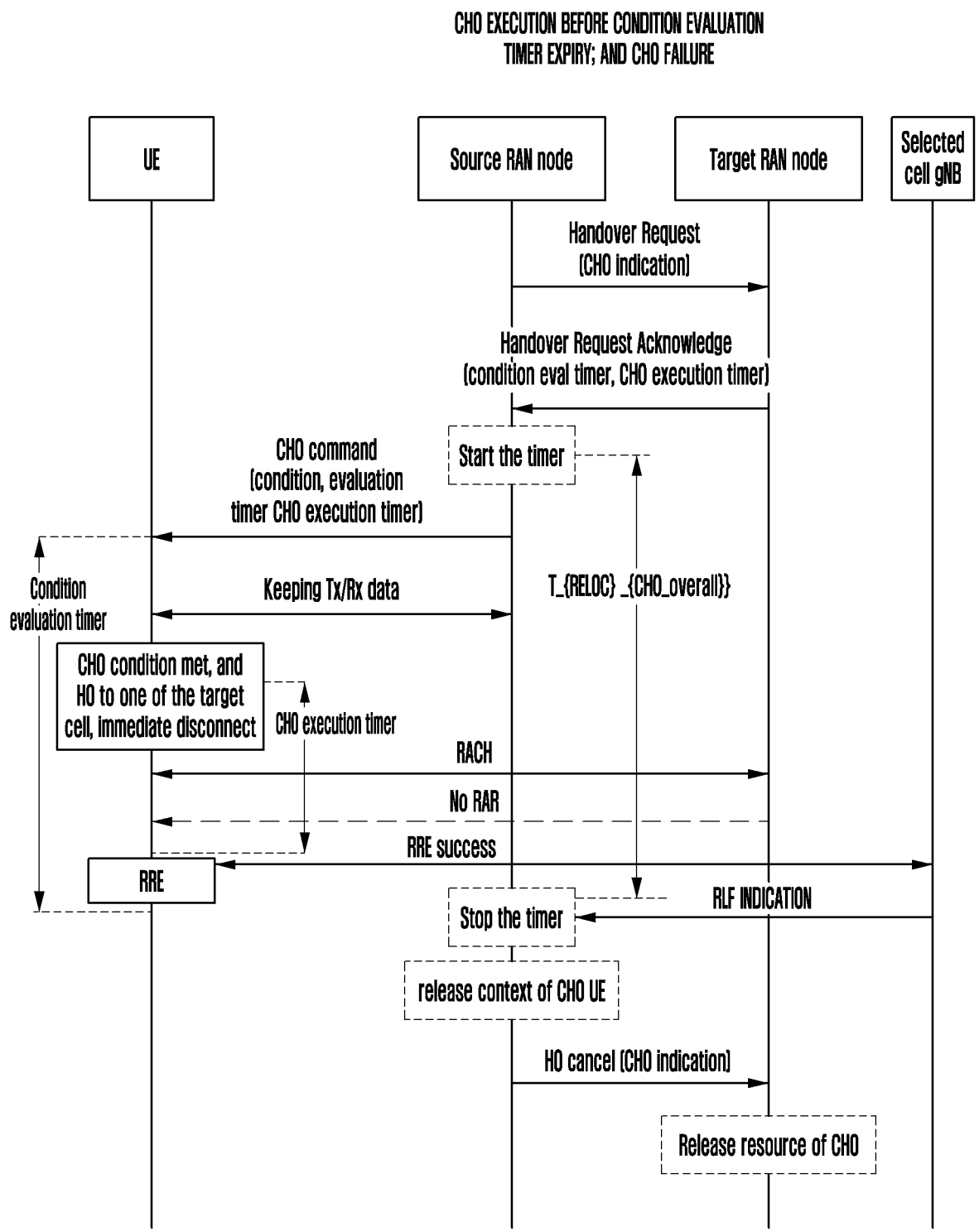
FIG. 13 is a diagram illustrating a process of performing re-establishment due to execution timer expiration, in the case of configuration operation of a conditional handover through a timer, according to an embodiment.

FIG. 13 is a diagram illustrating a process of performing re-establishment due to execution timer expiration, in the case of configuration operation of a conditional handover through a timer, according to an embodiment of the disclosure. A terminal starts the CHO execution timer when the CHO is performed to the target cell by satisfying the condition while the condition evaluation timer is running. If the execution timer expires, the HO fails from the target cell during that time, and if no additional cells satisfy the condition or if the evaluation timer has also expired, it is regarded as an HO failure and the RRE is performed. In this process, when the serving node receives the RLF indication from the cell selected by performing RRC connection re-establishment (RRE), the serving node stops the T_reloc timer in operation and releases the UE context.

Figure 14:
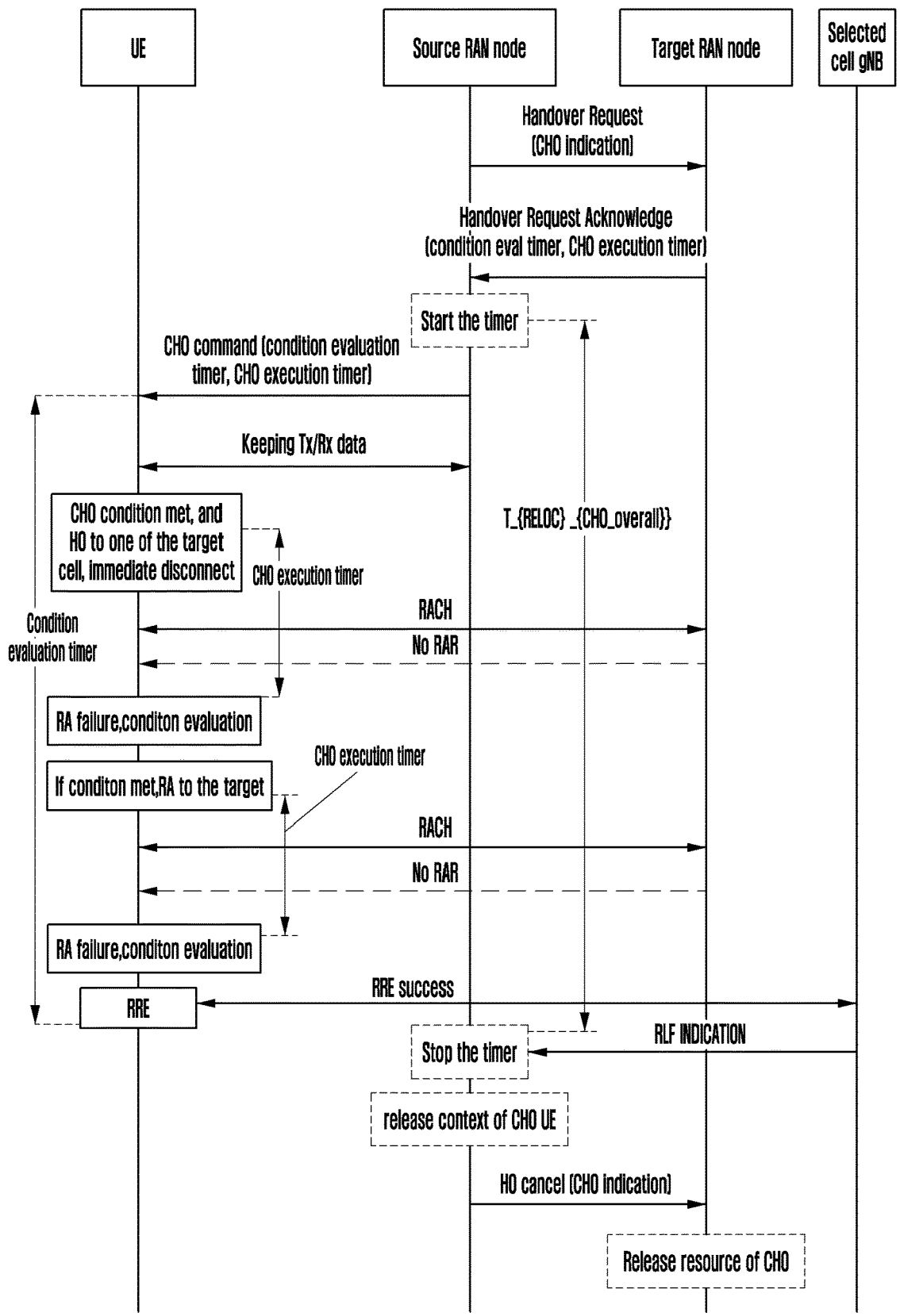
FIG. 14 is a diagram illustrating a process of performing re-establishment due to execution timer expiration in the case of configuration operation of a conditional handover through a timer, according to an embodiment.

FIG. 14 is a diagram illustrating a process of performing re-establishment due to execution timer expiration in the case of configuration operation of a conditional handover through a timer, according to an embodiment.

If the condition is satisfied while the condition evaluation timer is running, a terminal selects one target cell among candidate target cells satisfying the condition, performs the CHO, and operates the execution timer. If the HO does not succeed during this timer, another cell is selected among the condition satisfaction candidate target cells, and if the cell still satisfies the condition, the CHO is performed and the execution timer is started. If the condition is continuously determined and there are cells satisfying the condition, the CHOs are sequentially performed without overlapping the cells. If the CHO is performed on a specific target cell and fails, the evaluation timer is still valid, and no cell satisfies the condition, the RRE is performed. Alternatively, if the CHO is performed and has failed on a specific cell, the RRE is performed even if the evaluation timer expires. When the RLF indication is transmitted from the newly selected cell to the serving cell by performing the RRE, the serving node releases the UE context.

Figure 15:
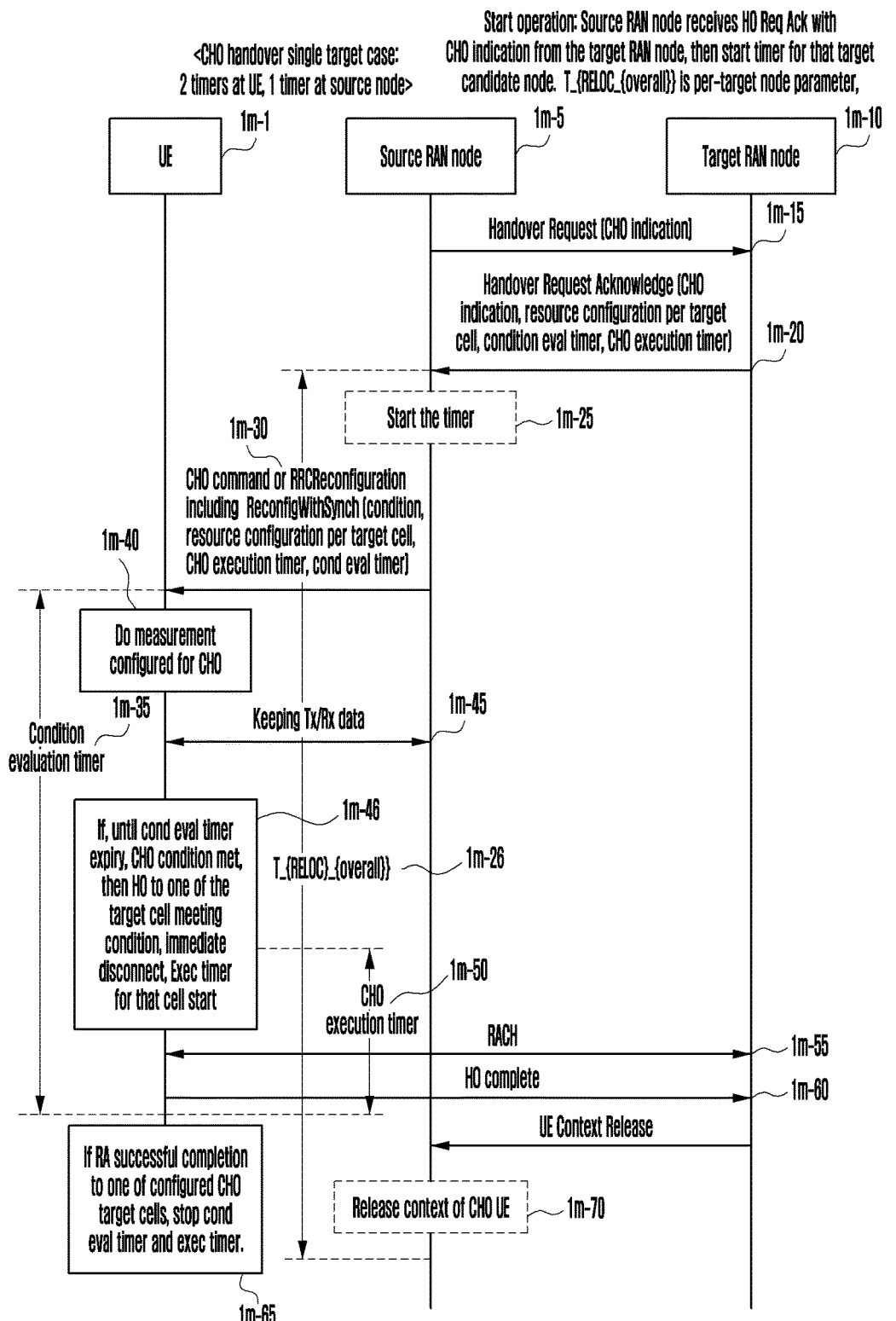
FIG. 15 is a diagram illustrating a case of conditional handover success before timer expiration in the case of configuration operation of a conditional handover through a timer, according to an embodiment.

FIG. 15 is a diagram illustrating a case of conditional handover success before time expiration in the case of configuration operation of a conditional handover through a timer, according to an embodiment.

A terminal 1*m*-1 has a connection state with a serving base station 1*m*-5 including a serving cell. When a handover request message including a factor distinguishable as a conditional handover (CHO) is transmitted to a base station 1*m*-10 of a target cell according to the determination of the serving cell, at 1*m*-15, a target base station 1*m*-10 performs admission control and transfers a handover request ACK message attached with a configuration value of a resource to be used for a handover to the serving base station 1*m*-5 again, at 1*m*-20. The information for CHO included in the HO request ACK message may be a condition used as a trigger condition when performing a CHO in the corresponding target cell, identification information of the target candidate cell, for example, PCI, CGI, node ID, etc., radio resource configuration information to be used by the terminal after the CHO in each candidate target cell, CHO execution timer information for failure determination when performing CHO, resource operation time (conditional evaluation timer) information for CHO operated by the node, etc. These pieces of information may be configured for every candidate target cell and transmitted to the serving base station, or the configuration information shared or used in common by a plurality of candidate target cells may be configured as a representative value and transmitted to the serving base station.

When a source node 1*m*-5 receives the message, the source node 1*m*-5 may start a timer corresponding to the conditional evaluation timer, at 1*m*-25. If the source node 1*m*-5 does not receive a UE context release message from a target node until the timer expires, at 1*m*-26, the resource indication information configured for CHO may be transferred to the target node included in the HO cancel message. The target node that has received the information may release the resources configured for the CHO. Operation 1*l*-60 of FIG. 12 may be referred to.

The serving base station 1*m*-5 that has received the message at 1*m*-20 transfers an RRC reconfiguration message including a reconfiguration With Sync IE or an HO command message to the terminal 1m-1, at 1m-30. In this message, the information received at 1m-20 may be transferred as it is, and additionally, a condition for performing CHO to a specific target cell may be added. Here, the condition may be composed of a measurement object and a report configuration.

The terminal 1m-1 that has received the message at 1m-30 starts the condition evaluation timer configured therein, at 1m-35.

In addition, the terminal 1m-1 that has received the message at 1m-30 performs measurement corresponding to the condition included in the message, and monitors whether an event given as a condition occurs, at 1m-40.

During this period, the terminal 1m-1 performs a general data transmission/reception operation with the serving cell 1m-5, at 1m-45.

In a situation where the condition evaluation timer does not expire, if the given event is satisfied for the CHO, the CHO is executed with one of the candidate targets satisfying the given event. Execution operations may include immediate disconnection from the serving cell, configuring according to the reconfiguration With Sync configuration information of the target cell executing the CHO, starting the CHO execution timer given to the target cell 1m-1, at 1m-50, RA to the target cell 1m-1, and transmitting an HO complete (or RRC reconfiguration complete) message at the time of RA success, at 1m-46.

When the condition evaluation timer does not expire, the terminal 1m-1 transmits an RA preamble to the target cell 1m-10 performing the CHO, at 1m-55.

Until the CHO execution timer started at 1m-50 expires, if the terminal 1m-1 performs RA to the selected candidate target cell and succeeds, that is, if the terminal 1m-1 receives an RAR from the target cell at 1m-55 and transmits an HO complete message to the target cell 1m-1, at 1m-60, the terminal 1m-1 stops the condition evaluation timer and the CHO execution timer, at 1m-65.

When the CHO is successful after the transmission of the HO complete message, the target node 1m-10 may transmit a UE context release message to the source node 1m-5.

When the source node 1m-5 receives the UE context release message before the expiry of the timer in the source node corresponding to a condition evaluation timer at 1m-26, the source node 1m-5 release the context of the terminal at 1n-70.

Figure 16:
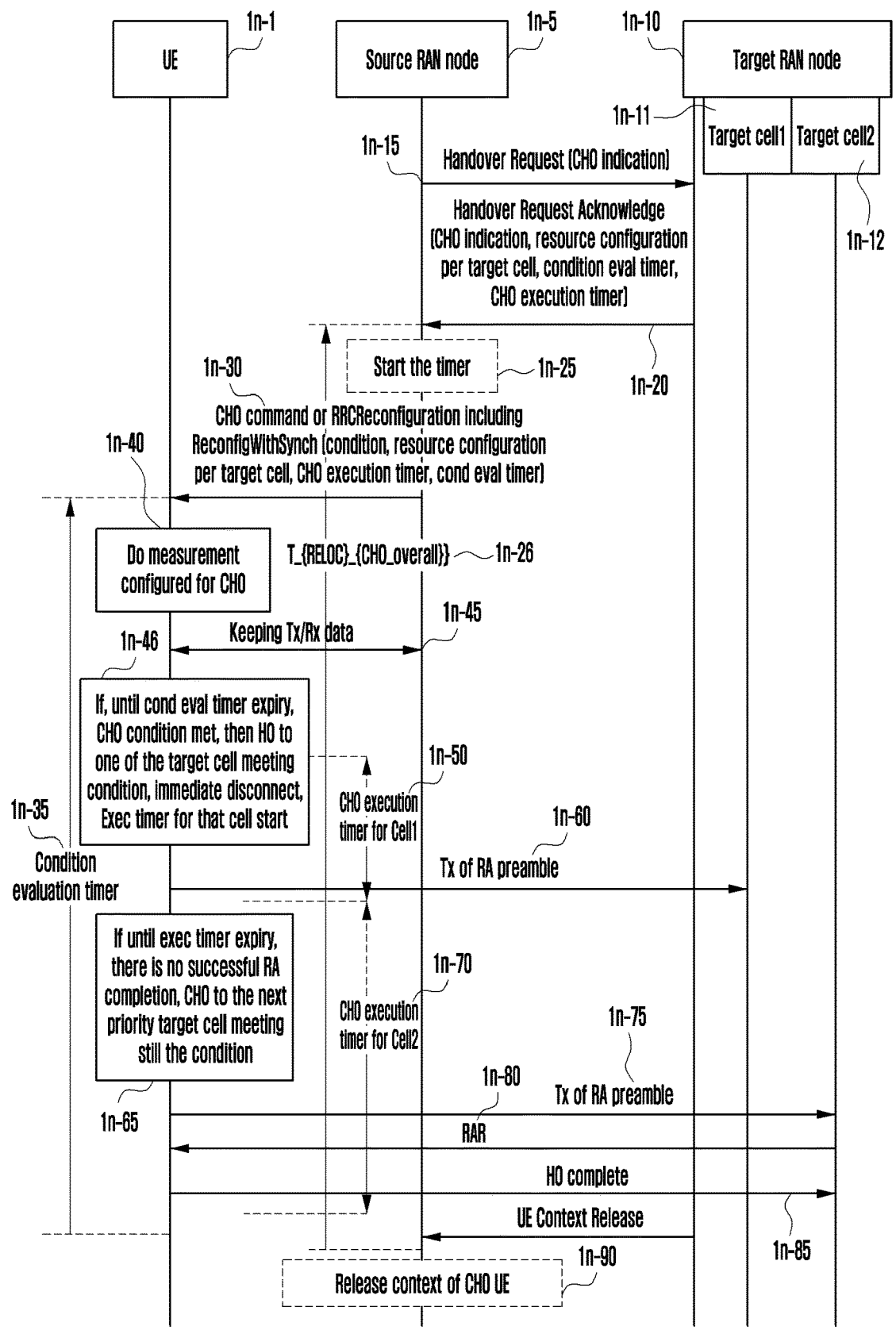
FIG. 16 is a diagram illustrating a case of conditional handover success through multiple target cells before timer expiration in the case of configuration operation of a conditional handover through a timer, according to an embodiment.

FIG. 16 is a diagram illustrating a case of conditional handover success through multiple target cells before expiration of a timer in the case of configuration operation of a conditional handover through a timer, according to an embodiment.

A terminal 1n-1 has a connection state with a serving base station 1n-5 including a serving cell. When a handover request message including a factor distinguishable as a CHO is transmitted to a base station 1n-10 of target cell 1 1n-11 and target cell 2 1n-12, according to the determination of the serving cell 1n-5, at 1n-15, a target base station performs admission control and transfers a handover request ACK message attached with a configuration value of a resource to be used for a handover to the serving base station 1n-5 again, at 1n-20. The information for CHO included in the HO request ACK message may be a condition used as a trigger condition when performing a CHO in the corresponding target cell, identification information of the target candidate cell, for example, PCI, CGI, node ID, etc., radio resource configuration information to be used by the terminal after the CHO in each candidate target cell, CHO execution timer information for failure determination when performing CHO, resource operation timer (condition evaluation timer) information for CHO operated by the node etc. These pieces of information may be configured for every candidate target cell and transmitted to the serving base station, or the configuration information shared or used in common by a plurality of candidate target cells may be configured as a representative value and transmitted to the serving base station.

When a source node 1n-5 receives the message, the source node 1n-5 may start a timer corresponding to the conditional evaluation timer, at 1n-25. If the source node 1n-5 does not receive a UE context release message from any target node until the timer expires, at 1n-26, the resource indication information configured for CHO may be included in the HO cancel message and transferred to the target node. The target node that has received the information may release the resources configured for the CHO. Operation 1l-60 of FIG. 12 may be referred to.

The serving base station 1n-5 that has received the message of 1n-20 transfers an RRC reconfiguration message including a reconfiguration With Sync IE or an HO command message to the terminal 1n-1, at 1n-30. In this message, the information received at 1n-20 may be transferred as it is, and additionally, a condition for performing CHO to a specific target cell may be added. Here, the condition may be composed of a measurement object and a report configuration.

The terminal 1n-1 that has received the message at 1n-30 starts the condition evaluation timer configured therein, at 1n-35.

In addition, the terminal 1n-1 that has received the message at 1n-30 performs measurement corresponding to the condition included in the message, and monitors whether an event given as a condition occurs, at 1n-40.

During this period, the terminal 1n-1 performs a general data transmission/reception operation with the serving cell 1n-5, at 1n-45.

In a situation where the condition evaluation timer does not expire, if the given event for the CHO is satisfied, the CHO is executed with one of the candidate targets satisfying the given event. Execution operations may include immediate disconnection from the serving cell, configuration the reconfiguration With Sync configuration information of the target cell executing CHO, starting the CHO execution timer given to the target cell, at 1n-50, RA to the target cell, and transmitting an HO complete (or RRC reconfiguration complete) message at the time of RA success, at 1n-46.

When the condition evaluation timer does not expire, the terminal 1n-1 transmits an RA preamble to the target cell 1 1n-11 performing CHO for RA, at 1n-60.

If the RA to target cell 1 1n-11 does not complete successfully until the CHO execution timer started at 1n-50 expires, the conditional evaluation timer has not yet expired, and there are still other cells that satisfy the initially satisfied condition except for the cells that have already attempted RA in the candidate target cell given at 1n-30, the terminal 1n-1 performs CHO at 1n-65 for the cell corresponding to the next priority among the corresponding cells. CHO execution may include, as mentioned at 1n-46, immediate disconnection from the serving cell, configuration the reconfiguration With Sync configuration information of the target cell executing the CHO, starting the CHO execution timer given to the target cell at 1n-70, RA to the corresponding target cell, and transmitting an HO complete (or RRC reconfiguration complete) message upon success of RA.

For example, if the terminal 1n-1 successfully performs RA to the target cell 2 1n-12 before the expiry of the CHO execution timer for the target cell 2 1n-12 which started at 1n-70, the terminal 1n-1 transmits an HO complete message to the target cell 2 1n-12 at 1n-85.

In other words, if the terminal 1n-1 may transmit an RA preamble to a corresponding target cell performing CHO at 1n-75 and receive an RAR from the target cell 2 1n-12 at 1n-80 before the expiry of the CHO execution timer for the target cell 2 1n-12, the terminal 1n-1 transmits an HO complete message to the target cell 2 1n-12 at 1n-85.

When the CHO is successful after the transmission of the HO complete message, the target node 1n-10 of the target cell 2 1n-12 may transmit a UE context release message to the source node 1n-5. When the source node 1n-5 receives the UE context release message before the expiry of the timer in the source node corresponding to a condition evaluation timer 1n-26, the source node 1n-5 release the context of the terminal at 1n-90.

If a separate CHO execution timer is configured for each candidate target cell at 1n-30, a timer value will be configured for each target cell. Otherwise, one timer value may be used as the CHO execution timer of all candidate target cells, at 1n-70.

That is, the terminal executes CHO for all candidate target cells satisfying the condition in a specific order or in order of the terminal implementation until the condition evaluation timer expires.

If the condition evaluation timer expires after the terminal transmits an RA preamble to a target cell, CHO measurement stopping, CHO related resource configuration, and releasing measurement configuration may be executed after the execution timer of the corresponding target cell expires.

When performing CHO to multiple target cells, the first CHO execution timer starts if the CHO condition is met after the CHO command of 1n-30 is received, and the second CHO execution timer starts if the previous CHO attempt fails or the previous CHO execution timer expires after the second CHO execution timer.

Figure 17:
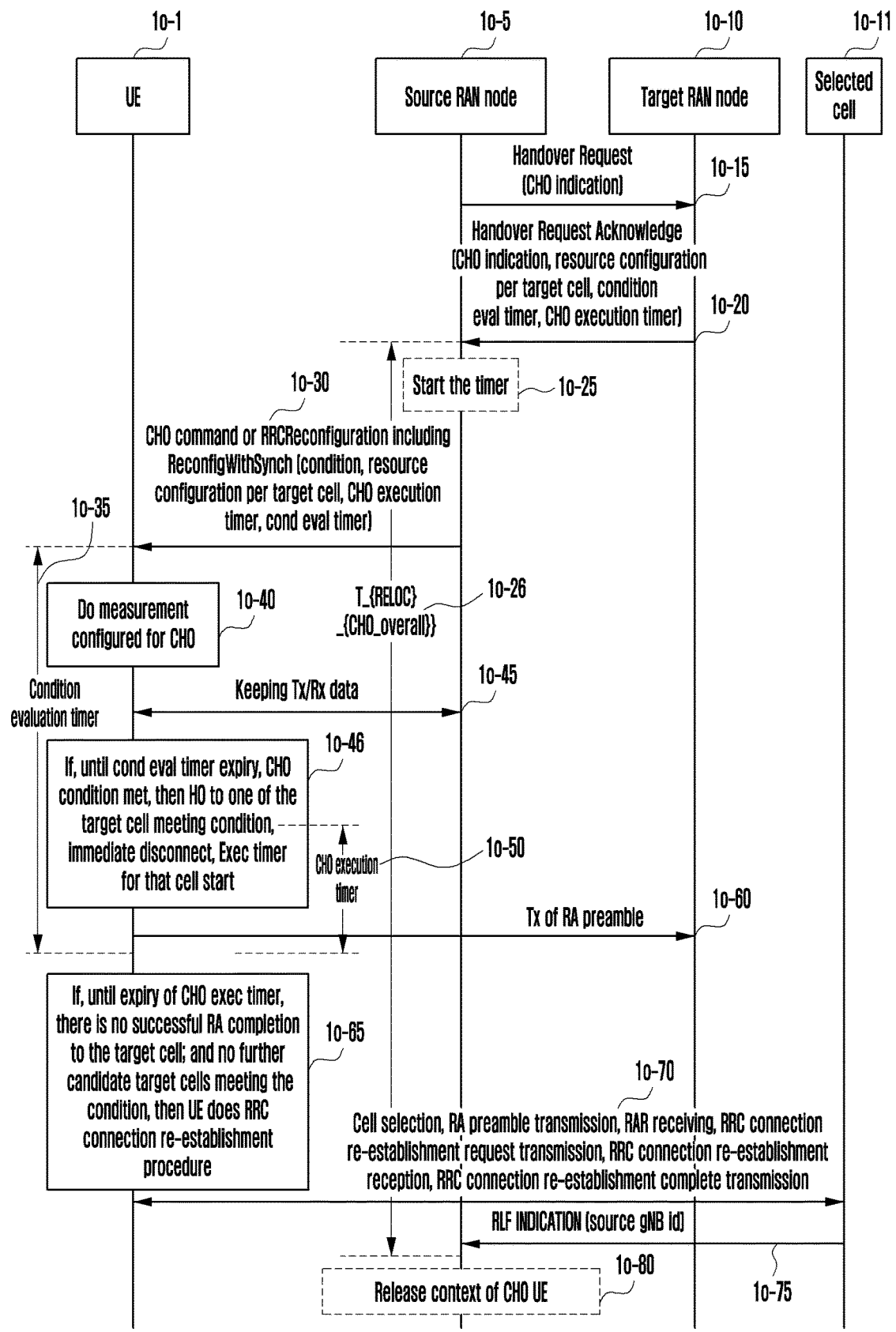
FIG. 17 is a diagram illustrating a case of conditional handover failure before timer expiration in the case of configuration operation of a conditional handover through a timer, according to an embodiment.

FIG. 17 is a diagram illustrating a case of conditional handover failure before expiration of a timer in the case of configuration operation of a conditional handover through a timer, according to an embodiment.

A terminal 1o-1 has a connection state with a serving base station 1o-5 including a serving cell. When a handover request message including a factor distinguishable as a CHO is transmitted to a base station 1o-10 of a target cell according to the determination of the serving cell, at 1o-15, a target base station 1o-10 performs admission control and transfers a handover request ACK message attached with a configuration value of a resource to be used for a handover to the serving base station 1o-5 again, at 1o-20. At this time, the information for CHO included in the HO request ACK message may be a condition used as a trigger condition when performing a CHO in the corresponding target cell, identification information of the target candidate cell, for example, PCI, CGI, node ID, etc., radio resource configuration information to be used by the terminal after the CHO in each candidate target cell, CHO execution timer information for failure determination when performing CHO, resource operation timer (condition evaluation timer) information for CHO operated by the node, etc. These pieces of information may be configured for every candidate target cell and transmitted to the serving base station, or the configuration information shared or used in common by a plurality of candidate target cells may be configured as a representative value and transmitted to the serving base station.

When a source node 1o-5 receives the message, the source node 1o-5 may start a timer corresponding to the condition evaluation timer, at 1o-25. If the source node 1o-5 does not receive a UE context release message from a target node until the timer expires, at 1o-26, the resource indication information configured for CHO may be transferred to the target node included in the HO cancel message. The target node 1o-10 that has received the information may release the resources configured for the CHO. Operation 1l-60 of FIG. 12 may be referred.

The serving base station 1o-5 that has received the message of 1o-20 transfers an RRC reconfiguration message including a reconfiguration With Sync IE or an HO command message to the terminal 1o-1, at 1o-30. In this message, the information received at 1o-20 may be transferred as it is, and additionally, a condition for performing CHO to a specific target cell may be added. Here, the condition may be composed of a measurement object and a report configuration.

The terminal 1o-1 that has received the message at 1o-30 starts the condition evaluation timer configured therein, at 1o-35.

In addition, the terminal that has received the message at 1o-30 performs measurement corresponding to the condition included in the message, and monitors whether an event given as a condition occurs, at 1o-40.

During this period, the terminal 1o-1 performs a general data transmission/reception operation with the serving cell, at 1o-45.

In a situation where the condition evaluation timer has not expired, if the event given for the CHO is satisfied, the CHO is executed with one of the candidate targets satisfying the given event. Execution operations at 1o-46 may include immediate disconnection from the serving cell, configuration the reconfiguration With Sync configuration information of the target cell executing the CHO, and starting the CHO execution timer given to the target cell, at 1o-50.

When the condition evaluation timer does not expire, the terminal 1o-1 transmits an RA preamble to the target cell performing the CHO for RA, at 1o-60.

If the CHO is executed to a specific cell and the RA is not completed successfully with the target cell executed before the CHO execution timer expires, and if a cell satisfying the event at 1o-46 that was given in CHO command at 1o-30 and satisfied for the previous CHO execution does not exist among the candidate target cells given in the CHO command at 1o-65, the CHO is considered to have failed and an RRC connection re-establishment procedure is performed at 1o-75.

The connection re-establishment procedure includes RA preamble transmission, RAR receiving, RRC connection re-establishment request transmission, RRC connection re-establishment reception, and RRC connection re-establishment complete transmission at 1o-70. When successful, a cell 1o-11 selected by performing RRE transmits an RLF indication to the source node 1o-15 at 1o-75 so that the source node 1o-5 may release the UE context of the terminal at 1o-80.

The disclosed embodiments, if the reservation is updated to reflect the change in the resource situation for the target cell every time, the amount of signals increases in the network and the terminal radio section, but the use of a timer can reduce the amount of such signals.

According to an embodiment of the disclosure, there is a need for a method for reserving a resource for a terminal to perform a conditional handover, and a resource reservation situation between a target cell and a terminal can be synchronized for a predetermined time due to a signal of the target cell or a timer operation in the terminal It should be noted that in the configuration diagrams illustrated in FIGS. 1 to 17, an control/data signal transmission method, an operational procedure example, and configuration diagrams are not intended to limit the scope of the disclosure. In other words, all components, entities, or operations described in the above embodiments should not be interpreted as essential components for the implementation of the disclosure, and may be implemented within a range that does not impair the nature of the disclosure, even if only some of the components are included.

The operations of the base station or the terminal described above can be realized by providing a memory device storing the corresponding program code to any component in the base station or the terminal device. That is, the controller of the base station or the terminal device can execute the above-described operations by reading out and executing the program code stored in the memory device by a processor or a central processing unit (CPU).

The various components of an entity, a base station, or a terminal device, modules, etc. described herein may be hardware circuits, such as complementary metal oxide semiconductor based logic circuits, firmware, hardware circuitry such as a combination of software and/or hardware and firmware and/or software embedded in a machine-readable medium. For example, various electrical structures and methods may be embodied using transistors, logic gates, and electrical circuits such as application specific semiconductors.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. A method performed by a first base station in a wireless communication system, the method comprising:
    transmitting, to a second base station, at least one handover (HO) request message related to a conditional handover (CHO);
    as a response to the at least one HO request message, receiving, from the second base station, at least one HO request acknowledge message including identifier information on at least one candidate cell for the CHO, respectively;
    receiving, from the second base station, a message related to at least one candidate cell to be cancelled among the at least one candidate cell for the CHO, the message including cause information indicating that resources for the at least one candidate cell to be cancelled are not available; and
    identifying the at least one candidate cell to be cancelled, based on the message received from the second base station.

2. The method of claim 1, wherein each of the at least one HO request acknowledge message includes a cell global identifier (CGI) of a candidate cell for the CHO.

3. The method of claim 1, wherein the at least one HO request message includes information indicating that the CHO is requested.

4. The method of claim 1, further comprising:
    transmitting, to a terminal, a radio resource control (RRC) reconfiguration message including information on the at least one candidate cell to be cancelled.

5. The method of claim 1, wherein the at least one HO request acknowledge message further includes configuration information for the at least one candidate cell for the CHO to be used by a terminal.

6. A first base station in a wireless communication system, the first base station comprising:
    a transceiver; and
    a controller coupled with the transceiver and configured to:
        transmit, to a second base station via the transceiver, at least one handover (HO) request message related to a conditional handover (CHO),
        as a response to the at least one HO request message, receive, from the second base station via the transceiver, at least one HO request acknowledge message including identifier information on at least one candidate cell for the CHO, respectively,
        receive, from the second base station via the transceiver, a message related to at least one candidate cell to be cancelled among the at least one candidate cell for the CHO, the message including cause information indicating that resources for the at least one candidate cell to be cancelled are not available, and
        identify the at least one candidate cell to be cancelled, based on the message received from the second base station.

7. The first base station of claim 6, wherein each of the at least one HO request acknowledge message includes a cell global identifier (CGI) of a candidate cell for the CHO.

8. The first base station of claim 6, wherein the at least one HO request message includes information indicating that the CHO is requested.

9. The first base station of claim 6, wherein the controller is further configured to:
    transmit, to a terminal via the transceiver, a radio resource control (RRC) reconfiguration message including information on the at least one candidate cell to be cancelled.

10. The first base station of claim 6, wherein the at least one HO request acknowledge message further includes configuration information for the at least one candidate cell for the CHO to be used by a terminal.

11. A method performed by a second base station in a wireless communication system, the method comprising:
    receiving, from a first base station, at least one handover (HO) request message related to a conditional handover (CHO) information;
    as a response to the at least one HO request message, transmitting, to the first base station, at least one HO request acknowledge message including identifier information on at least one candidate cell for the CHO, respectively; and
    transmitting, to the first base station, a message related to at least one candidate cell to be cancelled among the at least one candidate cell for the CHO, the message including cause information indicating that resources for the at least one candidate cell to be cancelled are not available.

12. The method of claim 11, wherein each of the at least one HO request acknowledge message includes a cell global identifier (CGI) of a candidate cell for the CHO.

13. The method of claim 11, wherein the at least one HO request message includes information indicating that the CHO is requested.

14. The method of claim 11, further comprising:
    identifying at least one candidate cell to be cancelled based on a determination of the second base station.

15. The method of claim 11, wherein the at least one HO request acknowledge message further includes configuration information for the at least one candidate cell for the CHO to be used by a terminal.

16. A second base station in a wireless communication system, the second base station comprising:
a transceiver; and
a controller coupled with the transceiver and configured to:
receive, from a first base station via the transceiver, at least one handover (HO) request message related to a conditional handover (CHO) information,
as a response to the at least one HO request message, transmit, to the first base station via the transceiver, at least one HO request acknowledge message including identifier information on at least one candidate cell for the CHO, respectively, and
transmit, to the first base station via the transceiver, a message related to at least one candidate cell to be cancelled among the at least one candidate cell for the CHO, the message including cause information indicating that resources for the at least one candidate cell to be cancelled are not available.

17. The second base station of claim 16, wherein each of the at least one HO request acknowledge message includes a cell global identifier (CGI) of a candidate cell for the CHO.

18. The second base station of claim 16, wherein the at least one HO request message includes information indicating that the CHO is requested.

19. The second base station of claim 16, wherein the controller is further configured to:
identify at least one candidate cell to be cancelled based on a determination of the second base station.

20. The second base station of claim 16, wherein the at least one HO request acknowledge message further includes configuration information for the at least one candidate cell for the CHO to be used by a terminal.

* * * * *